United States Patent
Hampel et al.

(10) Patent No.: US 10,849,142 B2
(45) Date of Patent: Nov. 24, 2020

(54) TIME-SENSITIVE NETWORKING FRAME PRE-EMPTION ACROSS CELLULAR INTERFACE

(71) Applicant: QUALCOMM Incorporated, San Diego, CA (US)

(72) Inventors: Karl Georg Hampel, Hoboken, NJ (US); Rajat Prakash, San Diego, CA (US); Peerapol Tinnakornsrisuphap, San Diego, CA (US); Satashu Goel, San Diego, CA (US); Junyi Li, Chester, NJ (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/353,906

(22) Filed: Mar. 14, 2019

(65) Prior Publication Data
US 2019/0289616 A1    Sep. 19, 2019

Related U.S. Application Data

(60) Provisional application No. 62/644,976, filed on Mar. 19, 2018.

(51) Int. Cl.
*H04W 72/12*    (2009.01)
*H04W 28/02*    (2009.01)
(Continued)

(52) U.S. Cl.
CPC ...... *H04W 72/1242* (2013.01); *H04B 7/0413* (2013.01); *H04W 28/0268* (2013.01);
(Continued)

(58) Field of Classification Search
CPC ......... H04W 72/1242; H04W 28/0268; H04W 28/24; H04W 72/10; H04W 72/1263;
(Continued)

(56) References Cited

U.S. PATENT DOCUMENTS

| 7,046,643 B1* | 5/2006 | Zellner | H04M 15/00 370/329 |
| 2008/0019395 A1* | 1/2008 | Aithal | H04L 1/0016 370/468 |
| 2019/0199641 A1* | 6/2019 | Lo Bello | H04L 47/628 |

OTHER PUBLICATIONS

International Search Report and Written Opinion—PCT/US2019/022453—ISA/EPO—dated May 7, 2019.
(Continued)

*Primary Examiner* — Sharad Rampuria
(74) *Attorney, Agent, or Firm* — Holland & Hart LLP

(57) ABSTRACT

Methods, systems, and devices for wireless communications are described. An access node may schedule traffic with different levels of priority for communications with a user equipment. The access node may receive a time-sensitive networking time-aware schedule from a first interface via an Ethernet frame that defines a set of periodic time intervals reserved for transmitting traffic with a high-priority (e.g., hard-real time traffic). In some cases, one or more frequency resources may additionally be reserved for the high-priority traffic. Accordingly, during the reserved time intervals, if the high-priority traffic is present, the access node may transmit the high-priority traffic on the reserved frequency resource(s). Outside the reserved time intervals, the access node may schedule lower-priority traffic on the reserved frequency resource(s) in addition to the other resources. Alternatively, high-priority traffic may interrupt previously scheduled lower-priority traffic during the reserved time intervals if high-priority traffic is present.

30 Claims, 16 Drawing Sheets

(51) Int. Cl.
H04W 28/24 (2009.01)
H04W 72/10 (2009.01)
H04B 7/0413 (2017.01)
(52) U.S. Cl.
CPC ........... H04W 28/24 (2013.01); H04W 72/10 (2013.01); H04W 72/1263 (2013.01)
(58) Field of Classification Search
CPC ............. H04W 72/0446; H04B 7/0413; H04B 7/2618
See application file for complete search history.

(56) References Cited

OTHER PUBLICATIONS

"3rd Generation Partnership Project; Technical Specification Group Services and System Aspects; Feasibility Study on LAN Support in 5G (Release 16)", 3GPP Draft; 22821-200, 3rd Generation Partnership Project (3GPP), Mobile Competence Centre, 650, Route Des Lucioles, F-06921 Sophia-Antipolis Cedex, France, Mar. 14, 2018 (Mar. 14, 2018), pp. 1-52, XP051532122, TR22.821 V2.0.0, Retrieved from the Internet: URL: http://www.3gpp.org/ftp/tsg_sa/TSG_SA/TSGS_79/Docs/SP-180166.zip [retrieved on Mar. 14, 2018], p. 27, Section 5.17.1; Figure 5.17-1, p. 29, Section 5.17.5.5, p. 32, Section 5.21—p. 35, Section 5.21.5.

Inoue A., et al., "A Prototype Evaluation of Low Latency Ethernet Switch with Frame Preemption", IEICE Technical Report, Denshi Jouhou Tsuushin Gakkai, JP, vol. 115, No. 123 (C52015-22), Jun. 25, 2015 (Jun. 25, 2015), pp. 69-74, XP009511763, ISSN: 0913-5685.

QUALCOMM: "5G System and LAN: Potential Architecture Realization", 3GPP Draft; 5G LAN Factory Automation Discussion Paper, 3rd Generation Partnership Project (3GPP), Mobile Competence Centre, 650, Route Des Lucioles, F-06921 Sophia-Antipolis Cedex, France, Aug. 21, 2017 (Aug. 21, 2017), pp. 1-10, XP051324688, Retrieved from the Internet: URL: http://www.3gpp.org/ftp/Meetings_3GPP_SYNC/SA1/Docs/ [retrieved on Aug. 21, 2017].

* cited by examiner

TIME-SENSITIVE NETWORKING FRAME PRE-EMPTION ACROSS CELLULAR INTERFACE

CROSS REFERENCES

The present application for patent claims the benefit of U.S. Provisional Patent Application No. 62/644,976 by HAMPEL, et al., entitled "Time-Sensitive Networking Frame Pre-Emption Across Cellular Interface," filed Mar. 19, 2018, assigned to the assignee hereof, and which is expressly incorporated by reference herein.

BACKGROUND

The following relates generally to wireless communication, and more specifically to time-sensitive networking (TSN) frame pre-emption across a cellular interface.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). In some wireless communications systems, various applications (e.g., motion control, discrete manufacturing, etc.) may utilize low latency communications (e.g., ultra-reliable low latency communications (URLLC)) to assure messages are transmitted reliably with minimal delay between an access node and a UE. In some cases, the low latency communications may occur at the same time as lower-priority communications. Accordingly, efficient techniques for scheduling the low latency communications with respect to the lower-priority communications are desired.

SUMMARY

The described techniques relate to improved methods, systems, devices, or apparatuses that support time-sensitive networking (TSN) frame pre-emption across a cellular interface. Generally, the described techniques provide for determining a periodic time interval for transmission of traffic having a first traffic priority, identifying a wireless communication frame structure for communicating on a wireless communication link at a second interface of the wireless device, and identifying that traffic having the first traffic priority and that traffic having a second traffic priority is to be communicated between the first interface and the second interface, where the second traffic priority includes a lower priority than the first traffic priority. In some cases, the wireless communication frame structure may include a first resource and a second resource that are available both within and outside of the periodic time interval for the transmission of traffic priority. Accordingly, the traffic having the first traffic priority may be scheduled on the first resource during the periodic time interval of the wireless communication frame structure, and the traffic having the second traffic priority may be scheduled on the second resource of the wireless communication frame structure during the periodic time interval and scheduled on both the first resource and the second resource of the wireless communication frame structure when outside of the periodic time interval.

Additionally or alternatively, the wireless communication frame structure may include the periodic time interval identified for priority communication of traffic having the first traffic priority across multiple resources such that lower priority traffic (e.g., traffic having the second traffic priority) is transmitted during the periodic time interval when traffic having the first traffic priority is not available. As such, the described techniques provide for scheduling, during the periodic time interval of the wireless communication frame structure, the traffic having the second traffic priority. In some cases, the traffic having the first traffic priority of the wireless communication frame structure may be identified to be available for transmission during the periodic time interval. Accordingly, based on the identification that traffic of the first traffic priority is available for transmission, transmission of the scheduled traffic having the second traffic priority may be interrupted in order to transmit the traffic of the first traffic priority of the wireless communication frame structure during the periodic time interval. In some cases, a capacity demand for each traffic priority, a traffic specifier for each traffic priority, a configuration for partition of a link capacity, or a combination thereof, may be used for scheduling the traffic during the periodic time interval of the wireless communication frame structure.

A method of wireless communication is described. The method may include determining a periodic time interval for transmission of traffic having a first traffic priority, the periodic time interval being based on a TSN schedule for hard-real time (RT) traffic received at a first interface of a wireless device via an Ethernet frame, identifying a wireless communication frame structure for communicating on a wireless communication link at a second interface of the wireless device, the wireless communication frame structure including a first resource and a second resource that are available both within and outside of the periodic time interval for the transmission of traffic having the first traffic priority, where the first resource and the second resource are different from each other, identifying that traffic having the first traffic priority and that traffic having a second traffic priority that is less than the first traffic priority is to be communicated between the first interface and the second interface, scheduling the traffic having the first traffic priority on the first resource of the wireless communication frame structure during the periodic time interval, and scheduling the traffic having the second traffic priority on the second resource of the wireless communication frame structure during the periodic time interval and on both the first resource and the second resource of the wireless communication frame structure outside of the periodic time interval.

An apparatus for wireless communication is described. The apparatus may include means for determining a periodic time interval for transmission of traffic having a first traffic priority, the periodic time interval being based on a TSN schedule for hard-RT traffic received at a first interface of a wireless device via an Ethernet frame, means for identifying a wireless communication frame structure for communicating on a wireless communication link at a second interface of the wireless device, the wireless communication frame structure including a first resource and a second resource that are available both within and outside of the periodic time interval for transmission of traffic having the first traffic priority, where the first resource and the second resource are different from each other, means for identifying that traffic having the first traffic priority and that traffic having a second traffic priority that is less than the first traffic priority is to be communicated between the first interface and the second interface, means for scheduling the traffic having the first traffic priority on the first resource of the wireless communication frame structure during the periodic time interval, and means for scheduling the traffic having the second traffic priority on the second resource of the wireless communication frame structure during the periodic time interval and on both the first resource and the second resource of the wireless communication frame structure outside of the periodic time interval.

Another apparatus for wireless communication is described. The apparatus may include a processor, memory in electronic communication with the processor, and instructions stored in the memory. The instructions may be operable to cause the processor to determine a periodic time interval for transmission of traffic having a first traffic priority, the periodic time interval being based on a TSN schedule for hard-RT traffic received at a first interface of a wireless device via an Ethernet frame, identify a wireless communication frame structure for communicating on a wireless communication link at a second interface of the wireless device, the wireless communication frame structure including a first resource and a second resource that are available both within and outside of the periodic time interval for transmission of traffic having the first traffic priority, where the first resource and the second resource are different from each other, identify that traffic having the first traffic priority and that traffic having a second traffic priority that is less than the first traffic priority is to be communicated between the first interface and the second interface, schedule the traffic having the first traffic priority on the first resource of the wireless communication frame structure during the periodic time interval, and schedule the traffic having the second traffic priority on the second resource of the wireless communication frame structure during the periodic time interval and on both the first resource and the second resource of the wireless communication frame structure outside of the periodic time interval.

A non-transitory computer-readable medium for wireless communication is described. The non-transitory computer-readable medium may include instructions operable to cause a processor to determine a periodic time interval for transmission of traffic having a first traffic priority, the periodic time interval being based on TSN schedule for hard-RT traffic received at a first interface of a wireless device via an Ethernet frame, identify a wireless communication frame structure for communicating on a wireless communication link at a second interface of the wireless device, the wireless communication frame structure including a first resource and a second resource that are available both within and outside of the periodic time interval for transmission of traffic having the first traffic priority, where the first resource and the second resource are different from each other, identify that traffic having the first traffic priority and that traffic having a second traffic priority that is less than the first traffic priority is to be communicated between the first interface and the second interface, schedule the traffic having the first traffic priority on the first resource of the wireless communication frame structure during the periodic time interval, and schedule the traffic having the second traffic priority on the second resource of the wireless communication frame structure during the periodic time interval and on both the first resource and the second resource of the wireless communication frame structure outside of the periodic time interval.

In some examples of the method, apparatus, and non-transitory computer-readable medium described above, identifying the wireless communication frame structure includes identifying a first capacity demand corresponding to traffic having the first traffic priority. Some examples of the method, apparatus, and non-transitory computer-readable medium described above may further include processes, features, means, or instructions for identifying a second capacity demand corresponding to traffic having the second traffic priority. Some examples of the method, apparatus, and non-transitory computer-readable medium described above may further include processes, features, means, or instructions for allocating the first resource and the second resource based at least in part on the first capacity demand, the second capacity demand, and a link capacity of the wireless communication link.

Some examples of the method, apparatus, and non-transitory computer-readable medium described above may further include processes, features, means, or instructions for identifying a first traffic specifier indicating traffic having the first traffic priority. Some examples of the method, apparatus, and non-transitory computer-readable medium described above may further include processes, features, means, or instructions for identifying a second traffic specifier indicating traffic having the second traffic priority. Some examples of the method, apparatus, and non-transitory computer-readable medium described above may further include processes, features, means, or instructions for scheduling traffic based at least in part on whether the traffic may be identified with either the first traffic specifier or the second traffic specifier.

Some examples of the method, apparatus, and non-transitory computer-readable medium described above may further include processes, features, means, or instructions for identifying a configuration for partition of a link capacity of the wireless communication link into the first resource and the second resource, the configuration based on a first capacity demand corresponding to traffic having the first traffic priority and a second capacity demand corresponding to traffic having the second traffic priority, and including a first traffic specifier indicating traffic having the first traffic priority and a second traffic specifier indicating traffic having the second traffic priority.

In some examples of the method, apparatus, and non-transitory computer-readable medium described above, identifying the configuration includes receiving the configuration from a core network node or from another network node.

In some examples of the method, apparatus, and non-transitory computer-readable medium described above, the core network node may be one of a mobility management entity (MME), a gateway (GW), a core access and mobility management function (AMF), a session management function (SMF), or a user plane function (UPF).

In some examples of the method, apparatus, and non-transitory computer-readable medium described above, the first traffic specifier and the second traffic specifier may be indicated by at least one of a bearer identifier (ID), a fifth generation (5G) quality of service (QoS) indicator (5QI), a traffic flow template (TFT) entry, a flow indicator, a flow specifier, a packet data network (PDN) connection, a protocol data unit (PDU) session, or a tunnel ID.

In some examples of the method, apparatus, and non-transitory computer-readable medium described above, identifying the configuration includes identifying a synchronization of the first resource and the second resource with an absolute clock.

Some examples of the method, apparatus, and non-transitory computer-readable medium described above may further include processes, features, means, or instructions for scheduling a first part of a transmission for the traffic having the second traffic priority on both the first resource and the second resource outside of the periodic time interval. Some examples of the method, apparatus, and non-transitory computer-readable medium described above may further include processes, features, means, or instructions for scheduling a second part of the transmission for the traffic having the second traffic priority on the second resource within the periodic time interval.

Some examples of the method, apparatus, and non-transitory computer-readable medium described above may further include processes, features, means, or instructions for scheduling a first part of a transmission for the traffic having the second traffic priority on the second resource within the periodic time interval. Some examples of the method, apparatus, and non-transitory computer-readable medium described above may further include processes, features, means, or instructions for scheduling a second part of the transmission for the traffic having the second traffic priority on both the first resource and the second resource outside of the periodic time interval.

In some examples of the method, apparatus, and non-transitory computer-readable medium described above, the first resource and the second resource differ by at least one of frequency bands, subcarriers, tones, codes, multiple-input multiple-output (MIMO) layers, antenna ports, or beams.

In some examples of the method, apparatus, and non-transitory computer-readable medium described above, the first traffic priority and the second traffic priority may be indicated by at least one of a QoS class identifier (QCI), a QoS flow identifier (QFI), or a 5QI.

A method of wireless communication is described. The method may include determining a periodic time interval for transmission of traffic having a first traffic priority, the periodic time interval being based on a TSN schedule for hard-RT traffic received at a first interface of a wireless device via an Ethernet frame, identifying a wireless communication frame structure for communicating on a wireless communication link at a second interface of the wireless device where the wireless device is configured for priority communication of traffic having the first traffic priority via the wireless communication frame structure during the periodic time interval, identifying that the traffic having the first traffic priority and that the traffic having a second traffic priority that is less than the first traffic priority is to be communicated between the first interface and the second interface, scheduling, during the periodic time interval of the wireless communication frame structure, the traffic having the second traffic priority, identifying that the traffic of the first traffic priority is available for transmission during the periodic time interval of the wireless communication frame structure, and interrupting, based at least in part on the identification that the traffic of the first traffic priority is available, transmission of the scheduled traffic having the second traffic priority in order to transmit the traffic of the first traffic priority during the periodic time interval of the wireless communication frame structure.

An apparatus for wireless communication is described. The apparatus may include means for determining a periodic time interval for transmission of traffic having a first traffic priority, the periodic time interval being based on a TSN schedule for hard-RT traffic received at a first interface of a wireless device via an Ethernet frame, means for identifying a wireless communication frame structure for communicating on a wireless communication link at a second interface of the wireless device, where the wireless device is configured for priority communication of traffic having the first traffic priority via the wireless communication frame structure during the periodic time interval, means for identifying that the traffic having the first traffic priority and that the traffic having a second traffic priority that is less than the first traffic priority is to be communicated between the first interface and the second interface, means for scheduling, during the periodic time interval of the wireless communication frame structure, the traffic having the second traffic priority, means for identifying that the traffic of the first traffic priority is available for transmission during the periodic time interval of the wireless communication frame structure, and means for interrupting, based at least in part on the identification that traffic of the first traffic priority is available, transmission of the scheduled traffic having the second traffic priority in order to transmit the traffic of the first traffic priority during the periodic time interval of the wireless communication frame structure.

Another apparatus for wireless communication is described. The apparatus may include a processor, memory in electronic communication with the processor, and instructions stored in the memory. The instructions may be operable to cause the processor to determine a periodic time interval for transmission of traffic having a first traffic priority, the periodic time interval being based on a TSN schedule for hard-RT traffic received at a first interface of a wireless device via an Ethernet frame, identify a wireless communication frame structure for communicating on a wireless communication link at a second interface of the wireless device, where the wireless device is configured for priority communication of traffic having the first traffic priority via the wireless communication frame structure during the periodic time interval, identify that the traffic having the first traffic priority and that the traffic having a second traffic priority that is less than the first traffic priority is to be communicated between the first interface and the second interface, schedule, during the periodic time interval of the wireless communication frame structure, the traffic having the second traffic priority, identify that the traffic of the first traffic priority is available for transmission during the periodic time interval of the wireless communication frame structure, and interrupt, based at least in part on the identification that the traffic of the first traffic priority is available, transmission of the scheduled traffic having the second traffic priority in order to transmit the traffic of the first traffic priority during the periodic time interval of the wireless communication frame structure.

A non-transitory computer-readable medium for wireless communication is described. The non-transitory computer-readable medium may include instructions operable to cause a processor to determine a periodic time interval for transmission of traffic having a first traffic priority, the periodic time interval being based on a TSN schedule for hard-RT traffic received at a first interface of a wireless device via an Ethernet frame, identify a wireless communication frame structure for communicating on a wireless communication link at a second interface of the wireless device, where the wireless device is configured for priority communication of traffic having the first traffic priority via the wireless communication frame structure during the periodic time interval, identify that the traffic having the first traffic priority and that the traffic having a second traffic priority that is less than the first traffic priority is to be communicated between the first interface and the second interface, schedule, during the periodic time interval of the wireless communication frame structure, the traffic having the second traffic priority, identify that the traffic of the first traffic priority is available for transmission during the periodic time interval of the wireless communication frame structure, and interrupt, based at least in part on the identification that the traffic of the first traffic priority is available, transmission of the scheduled traffic having the second traffic priority in order to transmit the traffic of the first traffic priority during the periodic time interval of the wireless communication frame structure.

Some examples of the method, apparatus, and non-transitory computer-readable medium described above may further include processes, features, means, or instructions for identifying a configuration for the periodic time interval of the wireless communication frame structure, the configuration including a first traffic specifier indicating traffic having the first traffic priority and a second traffic specifier indicating traffic having the second traffic priority.

In some examples of the method, apparatus, and non-transitory computer-readable medium described above, identifying the configuration includes receiving the configuration from a core network node or from another network node.

In some examples of the method, apparatus, and non-transitory computer-readable medium described above, the core network node may be one of an MME, a GW, an AMF, an SMF, or a UPF.

In some examples of the method, apparatus, and non-transitory computer-readable medium described above, the first traffic specifier and the second traffic specifier may be indicated by at least one of a bearer ID, a 5QI, a TFT entry, a flow indicator, a flow specifier, a PDN connection, a PDU session, or a tunnel ID.

In some examples of the method, apparatus, and non-transitory computer-readable medium described above, identifying the configuration includes identifying a synchronization of the periodic time interval with an absolute clock.

In some examples of the method, apparatus, and non-transitory computer-readable medium described above, the first traffic priority and the second traffic priority may be indicated by at least one of a QCI, a QFI, or a 5QI.

DETAILED DESCRIPTION

Figure 1:
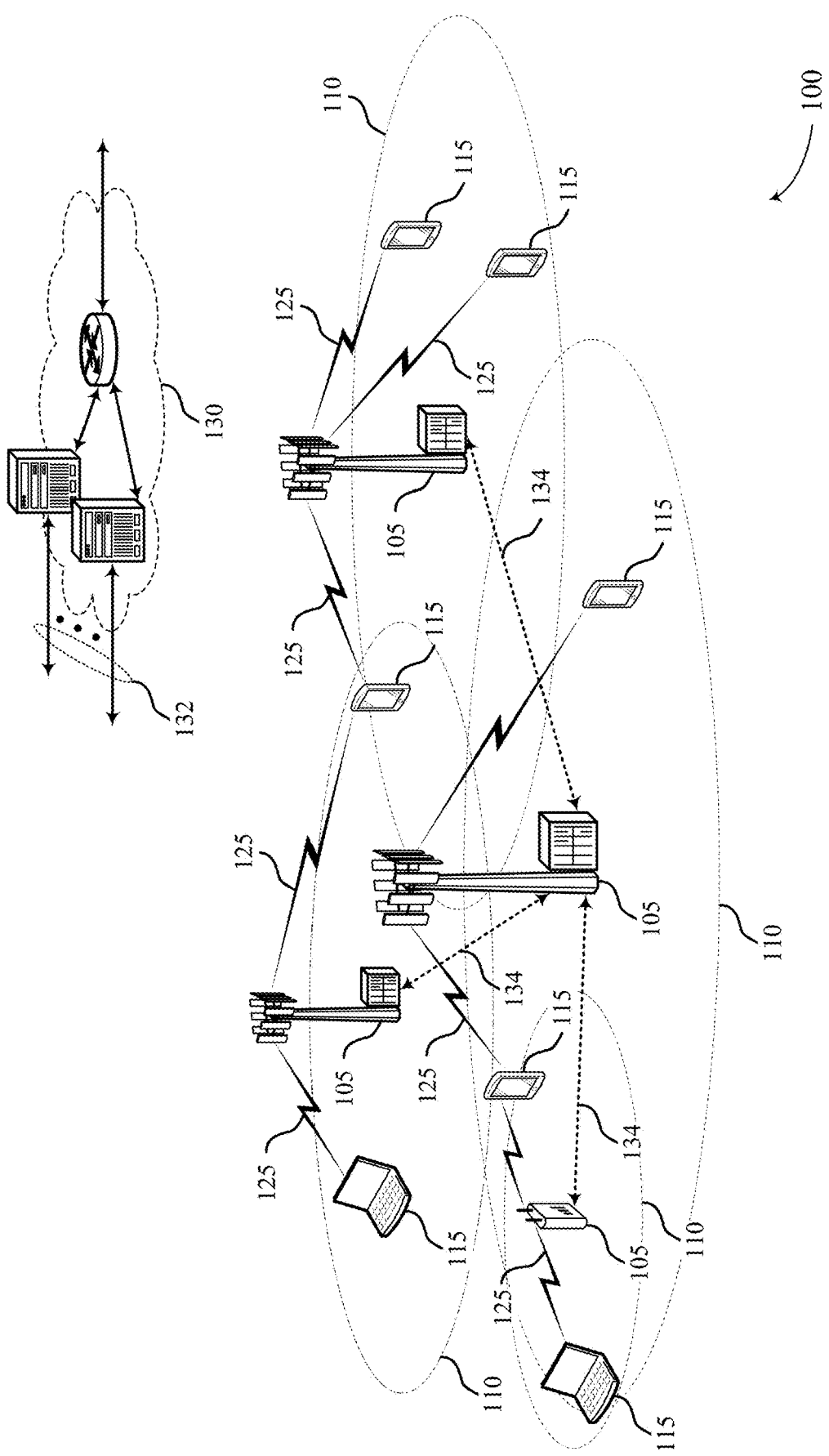
FIG. 1 illustrates an example of a system for wireless communication that supports time-sensitive networking (TSN) frame pre-emption across a cellular interface in accordance with aspects of the present disclosure.

In some wireless communications systems, various applications (e.g., motion control, discrete manufacturing, etc.) may utilize low latency communications (e.g., ultra-reliable low latency communications (URLLC)) to assure messages are transmitted reliably with minimal delay between an access node and a user equipment (UE). In some cases, the low latency communications may occur at the same time as lower-priority communications (e.g., with relation to the low latency communications). As such, the access node may employ time-sensitive networking (TSN), which includes a set of features that support scheduling hard-real time (hard-RT) traffic (e.g., the low latency communications) when different priority level communications occur simultaneously. In particular, TSN may include a frame pre-emption feature that allows prioritizing hard-RT traffic over lower-priority traffic in the time domain. In some cases, frame pre-emption may occur in a local area network (LAN) (e.g., Ethernet) with no influence on a physical layer operation. Additionally, frame-pre-emption may utilize resource-inefficient methods such as blanking out time intervals reserved for hard-RT traffic and including guard time intervals prior to the hard-RT traffic intervals. In some cases, the LAN may be run as a packet data network (PDN)-connection type or protocol data unit (PDU)-session type over separate wireless communications systems links (e.g., fourth generation (4G) or fifth generation (5G) systems). Accordingly, the access node may utilize methods for applying frame pre-emption on the wireless communications systems links that interface with the frame pre-emption occurring on a connected LAN.

For example, the access node may manage traffic prioritization in the presence of a time-aware schedule. In the present disclosure and without restriction to generality, one type of hard-RT traffic may be assumed, where time intervals reserved via the time-aware schedule are allocated for the hard-RT traffic. Additionally, a second priority traffic may arrive at any time either inside or outside the time intervals reserved for the hard-RT traffic, where the second priority traffic includes a priority level lower than the hard-RT traffic.

In some cases, the access node may be configured with a first set of absolute time intervals (e.g., time intervals reserved for the hard-RT traffic) referenced to a clock, a traffic specifier for the hard-RT traffic, a corresponding priority indicator, a corresponding capacity demand, or a combination thereof. The access node may reserve a downlink resource for the first set of time intervals based on the capacity demand (e.g., a certain bandwidth). During the first set of absolute time intervals, the access node may schedule hard-RT traffic using the reserved downlink resource, while scheduling lower-priority traffic using downlink resources other than the reserved downlink resource. Outside the first set of absolute time intervals, the access node may schedule lower-priority traffic on the reserved downlink resource in addition to the other downlink resources. When scheduling over a window that contains the start of an absolute time interval of the first set, the access node may schedule lower-priority traffic on the reserved downlink resource prior to when the absolute time interval of the first set begins. The access node may receive the configuration from a core network node or any network node. Additionally, for uplink traffic, the access node may follow similar steps, where one or more uplink resources may be reserved for hard-RT traffic during the first set of absolute time intervals by sending a scheduling grant with a traffic specifier for the hard-RT traffic.

Additionally or alternatively, the access node may be configured with a first set of absolute time intervals (e.g., time intervals reserved for the hard-RT traffic) referenced to a clock, a traffic specifier for hard-RT traffic, and a corresponding priority indicator. The access node may monitor arrival of the hard-RT traffic during the designated absolute time intervals. When the access node observes an empty buffer status for the hard-RT traffic based on the monitoring, the access node may schedule lower-priority traffic with a temporal granularity of a time window (e.g., a subframe). When the monitoring indicates that downlink hard-RT traffic arrives during a designated time interval, the access node may disrupt the ongoing schedule in order to transmit the hard-RT traffic. Additionally, the access node may indicate the change of schedule to the UE. The access node may receive the configuration from a core network node or any network node.

Aspects of the disclosure are initially described in the context of a wireless communications system. Additional aspects of the disclosure are exemplified through a time architecture, a process flow, and various priority scheduling schemes and frame structures. Aspects of the disclosure are further illustrated by and described with reference to apparatus diagrams, system diagrams, and flowcharts that relate to TSN frame pre-emption across a cellular interface.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access node, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related.

The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, communications between a base station 105 (e.g., an access node) and a UE 115 may include low latency communications (e.g., URLLC) for various applications (e.g., motion control, discrete manufacturing, etc.). The low latency communications may occur at the same time as communications that have a lower priority than the low latency communications (e.g., lower-priority communications). As such, the access node may employ TSN, which includes a set of features that support scheduling hard-RT traffic (e.g., the low latency communications) when different priority level communications are scheduled to occur simultaneously. In particular, TSN may include a frame pre-emption feature that allows prioritizing hard-RT traffic over lower-priority traffic in the time domain. In some cases, frame pre-emption may occur in a LAN (e.g., Ethernet) with no influence on a physical layer operation.

Accordingly, TSN may assume that a physical layer underneath the LAN link can use the temporal dimension to schedule and prioritize data. Therefore, a significant fraction of the time resource may be reserved for the hard-RT traffic and blanked out for lower-priority traffic. The fraction of the time resource blanked out for the lower-priority traffic (e.g., the blanked out resources are not available for the lower-priority traffic) may include time intervals reserved for the hard-RT traffic as well as an additional guard time before these intervals. The guard time may account for the transmission time of a lower-priority frame, thereby making the guard time unavailable for the hard-RT traffic. As such, these blanking out periods may add a significant delay to lower-priority traffic and reduce spectral efficiency, while the guard times may add a delay to the hard-RT traffic.

Wireless communications system 100 may support efficient techniques for scheduling higher-priority traffic (e.g., hard-RT traffic) with respect to lower-priority traffic (e.g., compared with the higher-priority traffic) between a base station 105 (e.g., an access node) and a UE 115. The base station 105 may manage traffic prioritization in the presence of a time-aware schedule, which may include time intervals reserved for the higher-priority traffic. In some cases, the base station 105 may reserve a downlink resource for a first set of time intervals based on a capacity demand (e.g., a certain bandwidth). Accordingly, the base station 105 may schedule the higher-priority traffic using the reserved downlink resource during the first set of time intervals, while scheduling the lower-priority traffic using downlink resources other than the reserved downlink resource. Outside the first set of time intervals, the base station 105 may schedule the lower-priority traffic on the reserved downlink resource in addition to the other downlink resources. Additionally, for uplink traffic, the base station 105 may follow similar steps, where one or more uplink resources may be reserved for higher-priority traffic during the first set of time intervals by sending a scheduling grant with a traffic specifier for the higher-priority traffic.

Additionally or alternatively, the base station 105 may monitor arrival of higher-priority traffic during the time intervals reserved for the higher-priority traffic. When the base station 105 observes an empty buffer status for the higher-priority traffic based on the monitoring the time intervals, the base station 105 may schedule lower-priority traffic with a temporal granularity of a time window (e.g., a subframe). When the monitoring indicates that downlink higher-priority traffic arrives during a designated time interval, the base station 105 may disrupt the ongoing schedule in order to transmit the higher-priority traffic. For example, the base station 105 may puncture scheduled lower-priority traffic with the higher-priority traffic and transmit the punctured lower-priority traffic after the higher-priority traffic is fully transmitted. Additionally, the base station 105 may indicate the change of schedule to the UE 115.

Figure 2:
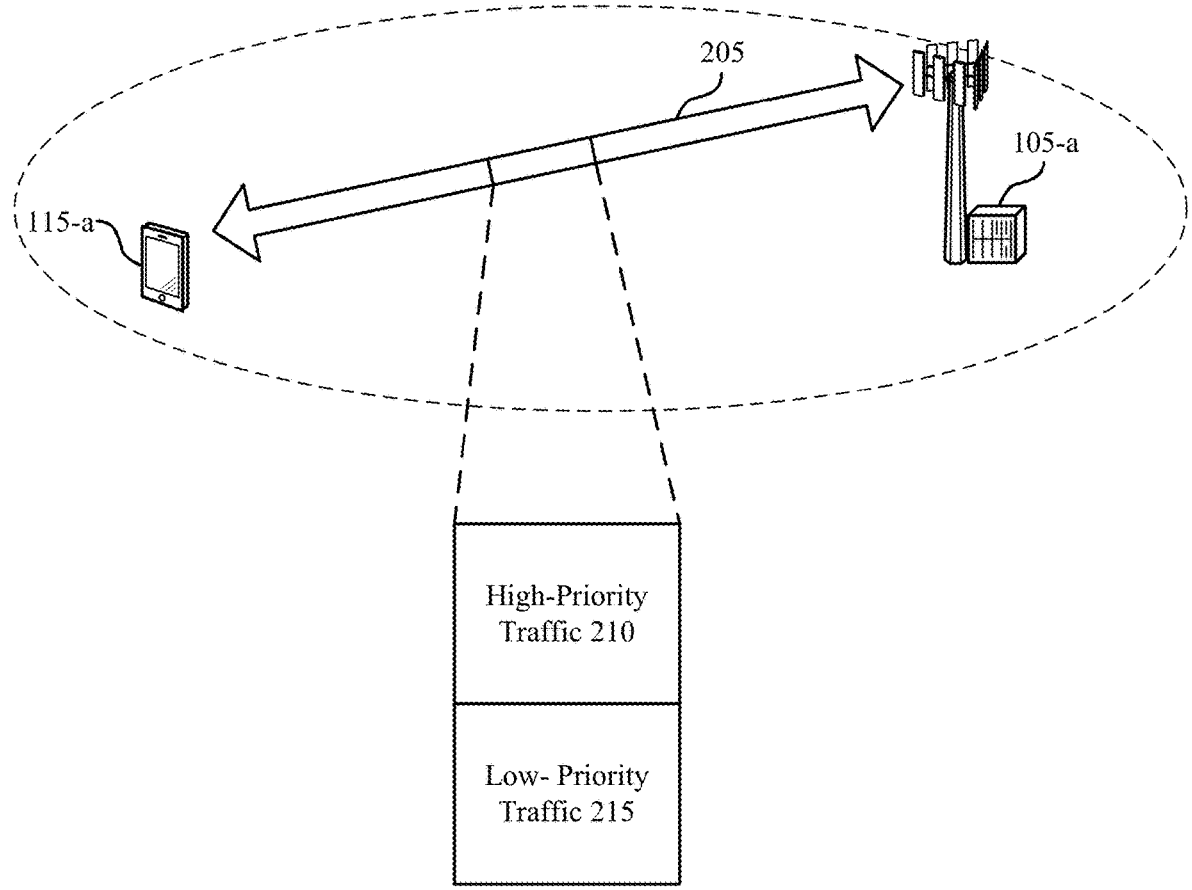
FIG. 2 illustrates an example of a wireless communications system that supports TSN frame pre-emption across a cellular interface in accordance with aspects of the present disclosure.

FIG. 2 illustrates an example of a wireless communications system 200 that supports TSN frame pre-emption across a cellular interface in accordance with various aspects of the present disclosure. In some examples, wireless communications system 200 may implement aspects of wireless communications system 100. Wireless communications system 200 may include a base station 105-*a* and a UE 115-*a*, which may be examples of corresponding base stations 105 and UEs 115 as described with reference to FIG. 1. In some cases, base station 105-*a* may be referred to as an access node. Base station 105-*a* may communicate with UE 115-*a* on resources of a carrier 205, where the communications may include high-priority traffic 210 (e.g., URLLC data and/or hard-RT traffic) and low-priority traffic 215. Low-priority traffic 215 may include a lower-priority level of data with respect to high-priority traffic 210.

As described herein, base station 105-*a* may schedule high-priority traffic 210 and low-priority traffic 215 on different resources of carrier 205 to increase a probability that high-priority traffic 210 is transmitted successfully and with minimal delay. In some cases, a core network node or another network node may configure base station 105-*a* with a set of time intervals reserved for high-priority traffic 210, where the set of time intervals are arranged according to an absolute clock. Base station 105-*a* may identify high-priority traffic 210 and low-priority traffic 215 based on capacity demand for the corresponding traffic type, a traffic specifier for the corresponding traffic type, or a combination thereof.

In some cases, base station 105-*a* may reserve one or more resources on carrier 205 for transmitting or receiving high-priority traffic 210 to or from UE 115-*a* during the reserved time intervals for high-priority traffic 210. Accordingly, when high-priority traffic 210 is present, base station 105-*a* may schedule high-priority traffic 210 on the reserved resources during the reserved time intervals. Additionally, base station 105-*a* may schedule low-priority traffic 215 on other resources of carrier 205 excluding the reserved resources during the reserved time intervals when high-priority traffic 210 is present. In some cases, the reserved resources and other resources may be synchronized according to the absolute clock used for scheduling the reserved time intervals. Outside of the reserved time intervals, base station 105-*a* may schedule low-priority traffic 215 on any resources of carrier 205, including the reserved resources. As such, if the scheduled low-priority traffic 215 extends into one of the reserved time intervals, base station 105-*a* may utilize the reserved resources for low-priority traffic 215 until the reserved time interval begins.

Additionally or alternatively, in some cases, base station 105-*a* may monitor for high-priority traffic 210 during the reserved time intervals. If base station 105-*a* observes an empty buffer status for high-priority traffic 210 based on the monitoring (e.g., high-priority traffic 210 is absent for a reserved time interval), base station 105-*a* may schedule low-priority traffic 215 for one or more symbols of the reserved time interval (e.g., a subframe). However, when the monitoring indicates that high-priority traffic 210 arrives during a reserved time interval, base station 105-*a* may disrupt the ongoing schedule for low-priority traffic 215 in order to transmit high-priority traffic 210. For example, base station 105-*a* may puncture scheduled low-priority traffic 215 with high-priority traffic 210 and transmit low-priority traffic 215 that was punctured once high-priority traffic 210 is fully transmitted.

In some cases, while not shown, it is to be understood that base station 105-*a* may communicate with more than one UE 115 on a high-priority carrier associated with high-priority traffic 210 and a low-priority carrier associated with low-priority traffic 215 simultaneously. For example, base station 105-*a* may schedule high-priority traffic 210 on a high-priority carrier with a first UE 115 and low-priority traffic 215 on a low-priority carrier with a second UE 115 in accordance with the techniques described above by prioritizing resources for the high-priority traffic (e.g., by either reserving resources for the high-priority traffic or puncturing the low-priority traffic with the high-priority traffic). Accordingly, base station 105-*a* may communicate with UE 115-*a* on different carriers for the respective, different types of traffic.

Figure 3:
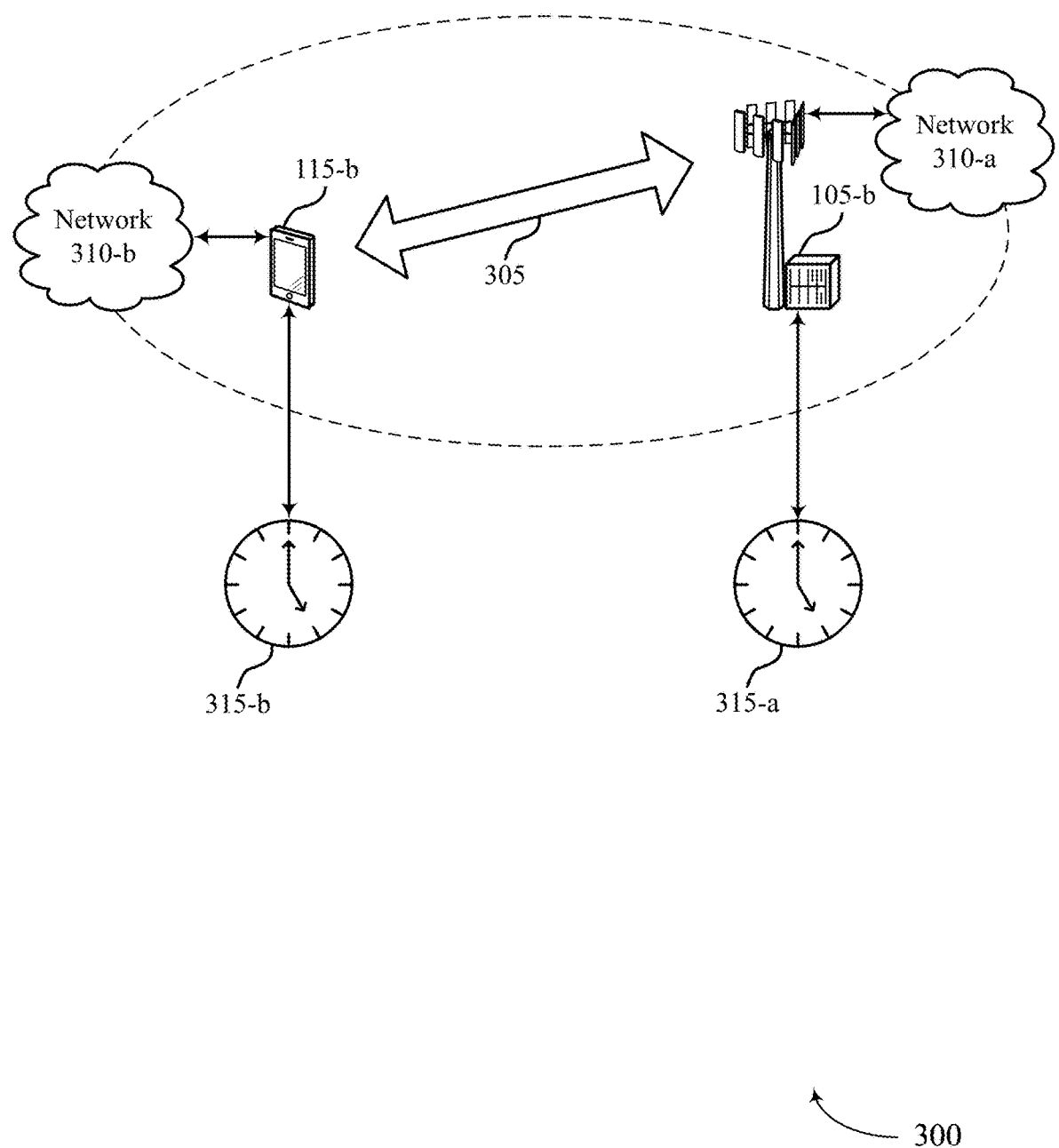
FIG. 3 illustrates an example of a time architecture that supports TSN frame pre-emption across a cellular interface in accordance with aspects of the present disclosure.

FIG. 3 illustrates an example of a time architecture 300 that supports TSN frame pre-emption across a cellular interface in accordance with various aspects of the present disclosure. In some examples, time architecture 300 may implement aspects of wireless communications systems 100 and 200. Time architecture 300 may include a base station 105-*b* and a UE 115-*b*, which may be examples of corresponding base stations 105 and UEs 115, respectively, as described with reference to FIGS. 1-2. In some cases, base station 105-*b* may be referred to as an access node. Base station 105-*b* may be connected to a first network 310-*a* (e.g., a LAN 1) over a first interface, and UE 115-*a* may be connected to a second network 310-*b* (e.g., a LAN 2) over a similar first interface. Additionally, base station 105-*b* may communicate with UE 115-*b* over a cellular interface 305, such that first network 310-*a* is interconnected with second network 310-*b* via cellular interface 305. Cellular interface 305 may be identified as a second interface for base station 105-*b* and UE 115-*b*. First network 310-*a* and second network 310-*b* may refer to two different sections of the same network or they may be different networks. Either of the networks may further consist of a single node (e.g., Ethernet node).

Base station 105-*b* may reside on a first node connected to the first network 310-*a*, and UE 115-*b* may reside on a second node connected to the second network 310-*b*. The first node may or may not include a user-plane function (UPF), a gateway (GW) (e.g., an S-GW, a P-GW, etc.), and/or other cellular core network nodes. In some cases, cellular interface 305 may support a frame structure defining system (e.g., an SFN, hyper frame number (HFN), subframe number, etc.).

The first node and the second node may hold a respective clock referred to as a network clock 315 (e.g., LAN clock). Network clock 315-*a* for the first node (e.g., base station 105-*b*) and network clock 315-*b* for the second node (e.g., UE 115-*b*) may be mutually synchronized. For example, such synchronization may be performed by Global Navigation Satellite System (GNSS or GLONASS) (e.g., Global Positioning System (GPS)). Additionally or alternatively, the synchronization may be performed via a Precision-Time-Protocol (PTP). In some cases, other nodes of first network 310-*a* and second network 310-*b* may also be time-synchronized.

Using the time synchronization of nodes in a network 310 for base station 105-*b* and UE 115-*b*, base station 105-*b* may reserve periodic time resources along a path in the network 310 for a specific traffic class (e.g., high-priority traffic, hard-RT traffic, URLLC data, etc.). For example, RT traffic with stringent latency constraints may travel along this path. Such a time-based resource reservation scheme may be referred to as time-aware scheduling. In some cases, time-aware scheduling may be used for TSN.

As described above with respect to FIG. 2, time-aware scheduling may be utilized to reserve time intervals for high-priority traffic, where high-priority traffic may be transmitted during the reserved time intervals on reserved resources or by puncturing scheduled low-priority traffic. Additionally, the network clocks 315 may synchronize reserved resources for high-priority traffic with other resources not reserved for the high-priority traffic.

Figure 4A:
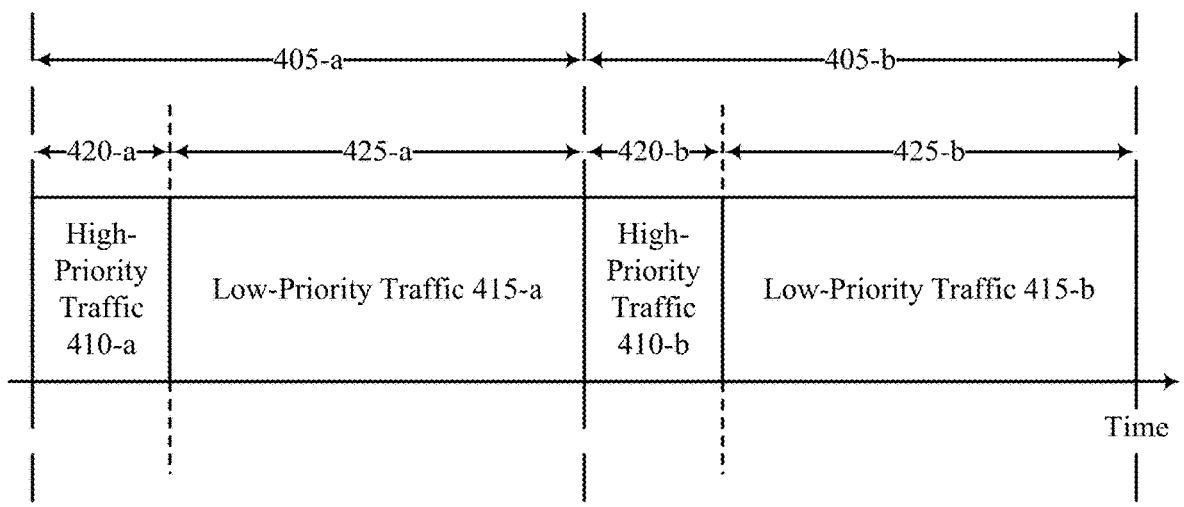
FIGS. 4A and 4B illustrate examples of priority scheduling schemes with periodic time intervals that support TSN frame pre-emption across a cellular interface in accordance with aspects of the present disclosure.

FIG. 4A illustrates an example of a priority scheduling scheme 400 that supports TSN frame pre-emption across a cellular interface in accordance with various aspects of the present disclosure. In some examples, priority scheduling scheme 400 may implement aspects of wireless communications systems 100 and 200. Additionally, priority scheduling scheme 400 may include aspects of a time-aware scheduling scheme as described above with respect to FIG. 3. A base station 105 may utilize priority scheduling scheme 400 to schedule sets of high-priority traffic 410 with respect to sets of low-priority traffic 415 as described herein.

For example, the base station 105 may schedule high-priority traffic 410-a in a first reserved time interval 420-a of a first periodic cycle 405-a. Additionally, the base station 105 may schedule low-priority traffic 415-a in a first remaining time interval 425-a of the first periodic cycle 405-a. If high-priority traffic 410-b is present in a second reserved time interval 420-b of a second periodic cycle 405-b, the base station 105 may schedule high-priority traffic 410-b accordingly, as well as low-priority traffic 415-b on a second remaining time interval 425-b of the second periodic cycle 405-b. In some cases, high-priority traffic 410 may include a traffic specifier to indicate a high-priority level (e.g., virtual LAN (VLAN) priority 3). Additionally, low-priority traffic 415 may include a traffic specifier to indicate a low-priority level (e.g., VLAN priorities 7, 6, 5, 4, 2, 1, and 0).

In some cases, time-aware scheduling may define a periodic cycle 405, which is time-locked to a network clock associated with a node (e.g., the base station 105). Each periodic cycle 405 may contain a fixed number of time intervals (e.g., a reserved time interval 420 and a remaining time interval 425).

Figure 4B:
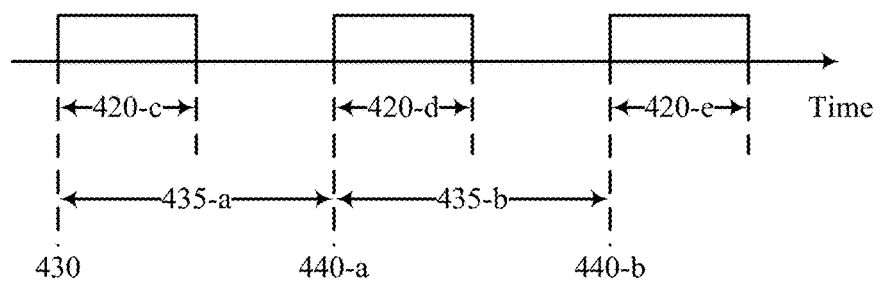

FIG. 4B illustrates an example of periodic time intervals 401 for a priority scheduling scheme that supports TSN frame pre-emption across a cellular interface in accordance with various aspects of the present disclosure. In some examples, periodic time intervals 401 for a priority scheduling scheme may implement aspects of wireless communications systems 100 and 200. Periodic time intervals 401 may include one or more reserved time intervals 420, which may be referenced to an absolute time base used for reservation of resources for a specific type of traffic (e.g., high-priority traffic) as described herein. Reserved time intervals 420 may indicate times where traffic associated with a high-priority in relation to the rest of the traffic may take precedence for data transmissions.

As described above with reference to FIG. 4A, time-aware scheduling may define a periodic cycle with a fixed number of time intervals 420 (e.g., a first time interval 420-c, a second time interval 420-d, and a third time interval 420-e). Each time interval 420 may be reserved for a specific traffic class or a specific set of traffic classes. Additionally, each cycle may be defined by an initial start time 430 (e.g., CycleStartTime or $t_n$). Each cycle may then step in time intervals 420 defined by a time duration 435 (e.g., TimeInterval) through a gate control list, which may further define which set of traffic classes are scheduled in successive time intervals 420. For example, each time interval 420 may be scheduled for high-priority traffic (e.g., hard-RT traffic), where first time interval 420-c starts at initial start time 430, second time interval 420-d starts after time duration 435-a at a starting time 440-a (e.g., $t_{n+1}$), and third time interval 420-e starts after a time duration 435-b with respect to starting time 440-a at a starting time 440-b (e.g., $t_{n+2}$).

In some cases, when using a cellular interface to support an Ethernet link, the frame structure of the cellular link may be time-locked to the absolute time intervals defined by the time-aware schedule.

Figure 5:
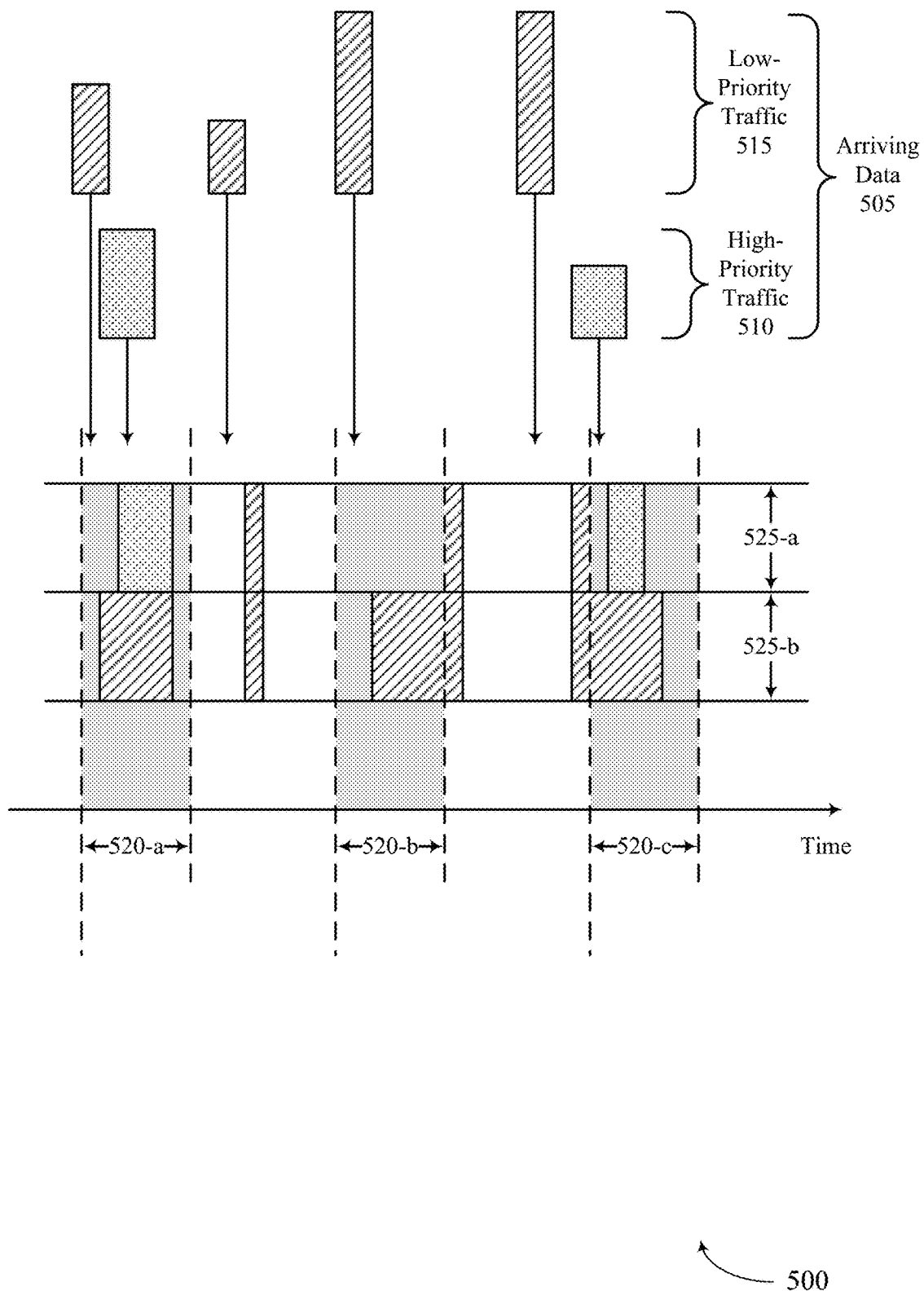
FIG. 5 illustrates an example of a priority scheduling scheme that supports TSN frame pre-emption across a cellular interface in accordance with aspects of the present disclosure.

FIG. 5 illustrates an example of a priority scheduling scheme 500 that supports TSN frame pre-emption across a cellular interface in accordance with various aspects of the present disclosure. In some examples, priority scheduling scheme 500 may implement aspects of wireless communications systems 100 and 200. Priority scheduling scheme 500 may include additional dimensions, such as frequency, code, or space, which may allow simultaneous scheduling of different priority levels of traffic for arriving data 505, including high-priority traffic 510 and low-priority traffic 515. A base station 105 and a UE 115 may communicate over a wireless communication link for high-priority traffic 510 and low-priority traffic 515.

As described above with reference to FIGS. 4A and 4B, priority scheduling scheme 500 may include a set of time intervals 520 reserved by a time-aware schedule (e.g., a TSN time-aware schedule) for scheduling high-priority traffic 510. In some cases, the time-aware schedule may be received through a first interface (e.g., from an Ethernet connection). Additionally, priority scheduling scheme 500 may include a resource differentiation into a first resource 525-a reserved for high-priority traffic 510 during time intervals 520 and a second resource 525-b which can be used for low-priority traffic 515 at all times. First resource 525-a and second resource 525-b may refer to different frequency bands, OFDM tones, subcarriers, MIMO layers, antenna ports, antenna beams, codes, etc.

The resource allocation for first resource 525-a or the resource allocating (e.g., partitioning) between first resource 525-a and second resource 525-b may be based on time intervals 520 defined by the time-aware schedule, a capacity of the wireless communication link between the base station 105 and the UE 115, and a capacity demand for arriving data 505 (e.g., a first capacity demand for high-priority traffic 510 and a second capacity demand for low-priority traffic 515) during reserved time intervals 520. In some cases, the base station 105 may obtain a configuration for time intervals 520 of the time-aware schedule (e.g., from a core network node or another network node), the capacity demand for high-priority traffic 510 (e.g., hard-RT traffic), a corresponding traffic specifier, and an indication that flags high-priority traffic 510 as of higher priority in relation to the rest of the traffic for arriving data 505.

According to priority scheduling scheme 500, high-priority traffic 510 arriving during time intervals 520 may have full access to first resource 525-a. At the same time, second resource 525-b may remain available for low-priority traffic 515. Outside time intervals 520, low-priority traffic 515 may utilize both first resource 525-a and second resource 525-b. For example, at time interval 520-a, both high-priority traffic 510 and low-priority traffic 515 may arrive and need to be scheduled. Accordingly, as described herein, high-priority traffic 510 may be scheduled on first resource 525-a, which may be reserved for higher-priority traffic during each time interval 520. Additionally, the arriving low-priority traffic 515 may be scheduled on second resource 525-b. A second amount of low-priority traffic 515 may then arrive outside of time interval 520-*a*. As such, the second amount of low-priority traffic may be scheduled on both first resource 525-*a* and second resource 525-*b*.

In some cases, low-priority traffic 515 may arrive close to a beginning of a time interval 520. Consequently, a scheduler (e.g., the base station 105 or the UE 115) may utilize both first resource 525-*a* and second resource 525-*b* for a fraction of low-priority traffic 515 up to the start time of the time interval 520. Additionally or alternatively, low-priority traffic 515 may be restricted to second resource 525-*a* after the start of the time interval 520 until the end of the time interval 520. In the same manner, the scheduler may handle resource allocation for low-priority traffic 515 which arrives close to the end of the time interval 520, where low-priority traffic 515 may be scheduled on second resource 525-*b* during the time interval 520 until the end of the time interval 520, when low-priority traffic 515 may be then scheduled on both first resource 525-*a* and second resource 525-*b*.

For example, an amount of low-priority traffic 515 may arrive during time interval 520-*b* such that the amount of low-priority traffic 515 may extend past the end of time interval 520-*b*. As such, the amount of low-priority traffic 515 may be scheduled on second resource 525-*b* during time-interval 520-*b* and scheduled on both first resource 525-*a* and second resource 525-*b* after time-interval 520-*b* ends. Additionally or alternatively, an amount of low-priority traffic 515 may arrive between time interval 520-*b* and time interval 520-*c* such that the amount of low-priority traffic may extend into the beginning of time interval 520-*c*. As such, the amount of low-priority traffic may be scheduled on both first resource 525-*a* and second resource 525-*b* until the start of time interval 520-*c* and then scheduled on second resource 525-*b* during time interval 520-*c*. Additionally, in some cases, an amount of high-priority traffic 510 may arrive during time interval 520-*c* and may be scheduled on first resource 525-*a* during time interval 520-*c*.

The scheduling (e.g., fine granularity scheduling) may be accomplished through smaller slot sizes (e.g., mini-slots or shortened TTIs (sTTIs)). Further, first resource 525-*a* may be allocated during time intervals designated for high-priority traffic 510 (e.g., hard-RT traffic) via semi-persistent scheduling (SPS).

In some cases, an access node (e.g., the base station 105) may be configured with a first set of absolute time intervals (e.g., time intervals 520 reserved for the high-priority traffic 510) referenced to a clock, a traffic specifier for hard-RT traffic (e.g., high-priority traffic 510), a corresponding priority indicator, a corresponding capacity demand, or a combination thereof. The access node may reserve a downlink resource (e.g., first resource 525-*a*) for the first set of absolute time intervals based on the capacity demand (e.g., a certain bandwidth). During the first set of absolute time intervals, the access node may schedule hard-RT traffic using the downlink resource, while scheduling lower-priority traffic (e.g., low-priority traffic 515) using downlink resources other than the reserved downlink resource (e.g., second resource 525-*b*). Outside the first set of absolute time intervals, the access node may schedule lower-priority traffic on the reserved downlink resource in addition to the other downlink resources (e.g., as shown in between time intervals 520-*a* and 520-*b*). When scheduling over a window that contains the start of an absolute time interval of the first set of absolute time intervals, the access node may schedule lower-priority traffic on the reserved downlink resource prior to when the absolute time interval of the first set of absolute time intervals begins (e.g., as shown for time interval 520-*c*). The access node may receive the configuration (e.g., for the first set of absolute time intervals and downlink resources) from a core network node or any network node. Additionally, for uplink traffic, the access node may follow similar steps, where one or more uplink resources may be reserved for hard-RT traffic during the first set of absolute time intervals by sending a scheduling grant with a traffic specifier for the hard-RT traffic.

The above described procedure may include the access node receiving a configuration, where the configuration may be provided by an MME, a GW (e.g., an S-GW, a P-GW, etc.), a core access and mobility management function (AMF), a session management function (SMF), or a UPF. Additionally or alternatively, the access node may receive the configuration from another network node (e.g., on application layer). As described above, the configuration may include a traffic specifier, a corresponding priority indicator, a corresponding capacity demand, or a combination thereof for each of the hard-RT traffic (e.g., high-priority traffic 510) and the lower-priority traffic (e.g., low-priority traffic 515). In some cases, the traffic priority indicator may refer to a quality of service (QoS) class identifier (QCI), a QoS flow identifier (QFI), or a fifth generation (5G) QoS indicator (5QI) (e.g., Additionally, the traffic specifier may refer to a bearer identifier (ID), a 5QI, a traffic flow template (TFT) entry, a flow indicator, a flow specifier, a PDN connection, a PDU session, or a tunnel ID.

Figure 6:
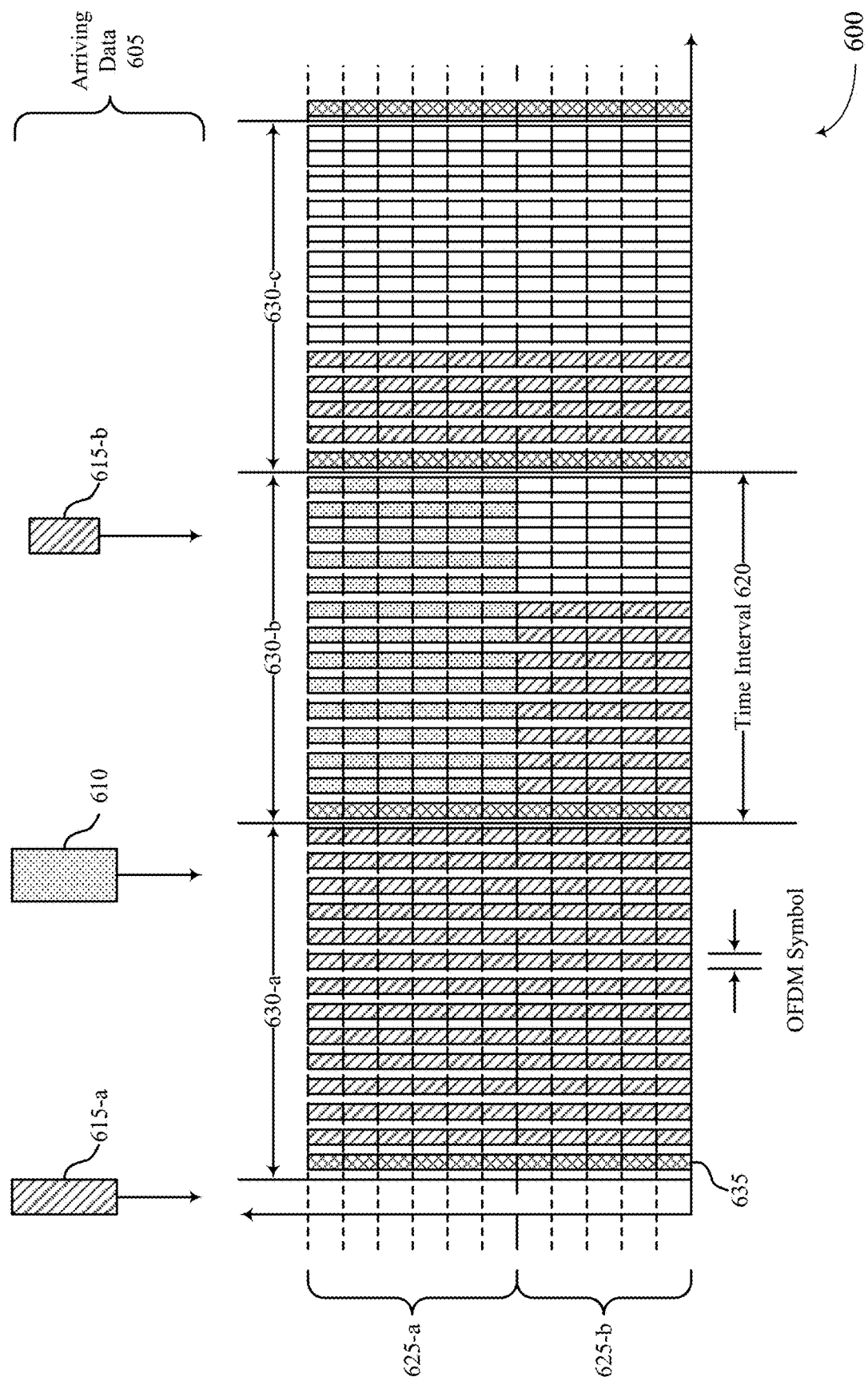
FIG. 6 illustrates an example of a priority scheduling frame structure that supports TSN frame pre-emption across a cellular interface in accordance with aspects of the present disclosure.

FIG. 6 illustrates an example of a priority scheduling frame structure 600 that supports TSN frame pre-emption across a cellular interface in accordance with various aspects of the present disclosure. In some examples, priority scheduling frame structure 600 may implement aspects of wireless communications systems 100 and 200. Additionally, priority scheduling frame structure 600 may include aspects of priority scheduling scheme 500 as described above with reference to FIG. 5. Accordingly, an amount of arriving data 605, including high-priority traffic 610 and low-priority traffic 615, may be scheduled such that a first resource 625-*a* is reserved for high-priority traffic 610 during a time interval 620 (e.g., where time interval 620 is determined from a first interface conveying a TSN time-aware schedule). Additionally, during time interval 620, low-priority traffic 615 may be scheduled on a second resource 625-*b*. Outside of time interval 620, low-priority traffic 615 may be scheduled on both first resource 625-*a* and second resource 625-*b*. Priority scheduling frame structure 600 may include a number of subframes 630 for scheduling high-priority traffic 610 and low-priority traffic 615, where each subframe 630 holds 14 OFDM symbols and the first of these symbols for each subframe 630 is used for a control channel 635 (e.g., a physical downlink control channel (PDCCH)).

For example, a first amount of low-priority traffic 615-*a* may arrive prior to a subframe 630-*a* (e.g., subframe m). Since subframe 630-*a* is outside of time interval 620, the first amount of low-priority traffic 615-*a* may be scheduled on first resource 625-*a* and second resource 625-*b*. The subsequent subframe 630-*b* (e.g., subframe m+1) may include time interval 620, where first resource 625-*a* is reserved for high-priority traffic 610. As such, when an amount of high-priority traffic 610 arrives prior to subframe 630-*b*, it may be scheduled on first resource 625-*a* during subframe 630-*b*. Additionally, a portion of the first amount of low-priority traffic 615-*a* may be left over after subframe 630-*a* ends, and the remaining portion may be scheduled on second resource 625-*b* during subframe 630-*b*. Further, a second amount of low-priority traffic 615-*b* may arrive during subframe 630-*b* and may be scheduled over first resource 625-*a* and second resource 625-*b* during a subframe 630-*c* (e.g., subframe m+2).

While time interval 620 reserved for high-priority traffic 610 is shown covering one subframe 630, it is to be understood that time interval 620 may cover multiple subframes 630 or a fraction of a subframe 630 (e.g., a set of symbols or a mini frame). Additionally, while priority scheduling frame structure 600 is shown with a frame structure which has been aligned with the time-aware schedule, it may be further possible to apply the proposed scheme in cases where frame structure and time-aware scheduling are not time aligned.

Figure 7:
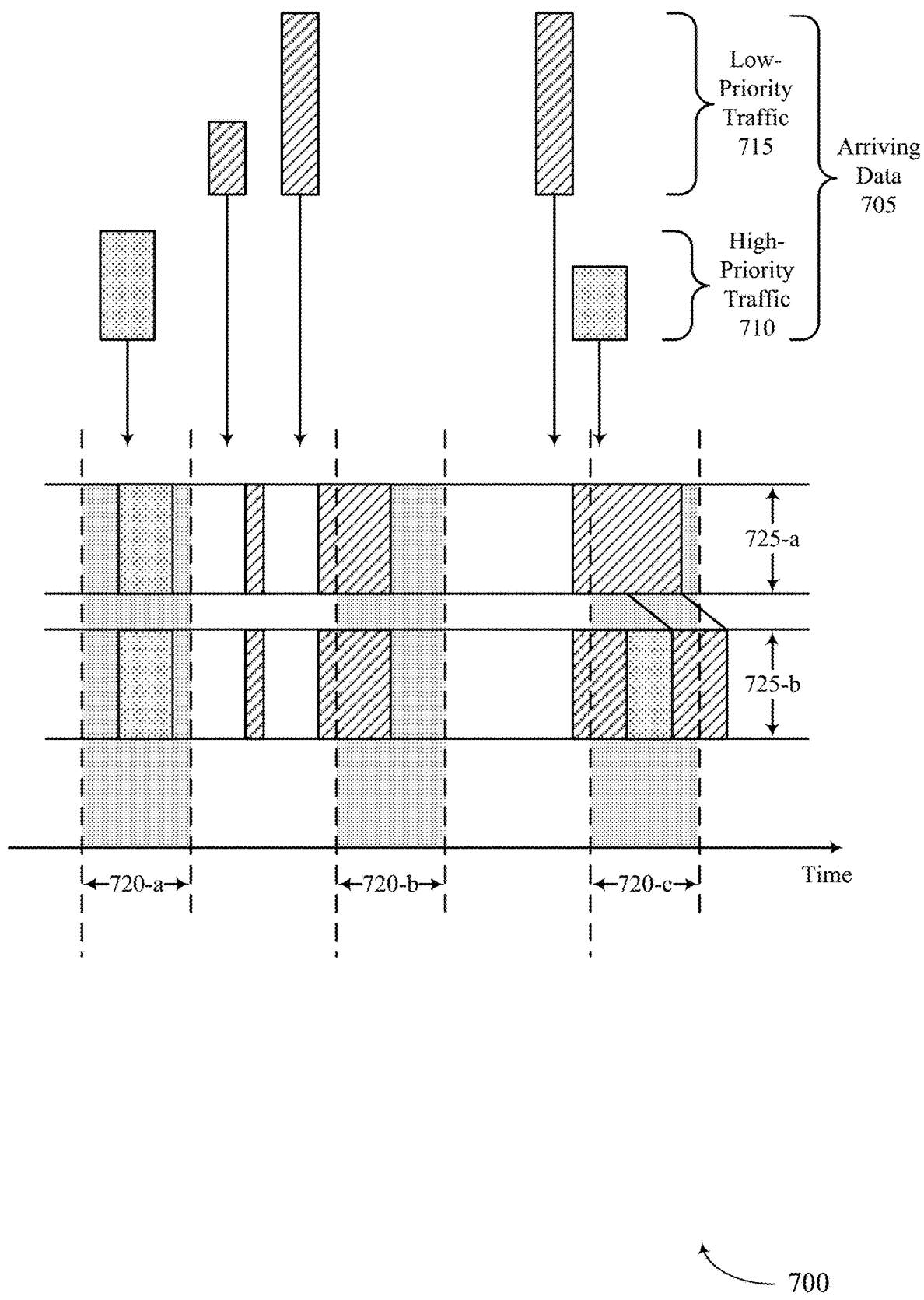
FIG. 7 illustrates an example of a priority scheduling disruption scheme that supports TSN frame pre-emption across a cellular interface in accordance with aspects of the present disclosure.

FIG. 7 illustrates an example of a priority scheduling disruption scheme 700 that supports TSN frame pre-emption across a cellular interface in accordance with various aspects of the present disclosure. In some examples, priority scheduling disruption scheme 700 may implement aspects of wireless communications systems 100 and 200. A base station 105 and a UE 115 may communicate over a wireless communication link through a second interface for arriving data 705, including high-priority traffic 710 and low-priority traffic 715. Priority scheduling disruption scheme 700 may include a traffic schedule scheme where lower priority traffic (e.g., low-priority traffic 715) is interrupted as soon as higher priority traffic (e.g., high-priority traffic 710 or URLLC traffic) arrives for communications between an access node (e.g., a base station 105) and a wireless device (e.g., a UE 115).

As described above with reference to FIGS. 4-6, priority scheduling disruption scheme 700 may include a set of time intervals 720 reserved by a time-aware schedule (e.g., a TSN time-aware schedule) for scheduling high-priority traffic 710. For example, an amount of high-priority traffic 710 may arrive and be scheduled and transmitted within a time interval 720-*a*. In some cases, the time-aware schedule may be received through a first interface from an Ethernet connection. Additionally, both high-priority traffic 710 and low-priority traffic 715 may utilize a same resource. An initial traffic schedule 725-*a* for communications on the same resources and an actual traffic transmission schedule 725-*b* based on a modified schedule as described herein are shown.

In some cases, a conflict may occur when an amount of high-priority traffic 710 arrives during a time interval 720-*c* where an amount of low-priority traffic 715 has already been previously scheduled. For example, the initial traffic schedule 725-*a* may be interrupted such that the amount of high-priority traffic 710 is transmitted immediately, and the remaining part of the initially scheduled low-priority traffic 715 may be appended at the end as shown during time interval 720-*c* in the actual traffic transmission schedule 725-*b*. Additionally, when an amount of high-priority traffic 710 does not arrive, any low-priority traffic 715 may be scheduled on the resource, including during a time interval 720. For example, an amount of low-priority traffic 715 may arrive prior to a time interval 720-*b*, and since no high-priority traffic 710 arrives, the amount of low-priority traffic 715 may be transmitted on the resource in the actual traffic transmission schedule 725-*b* as scheduled in the initial traffic schedule 725-*a*.

Additionally, the access node (e.g., the base station 105) may be configured with a first set of absolute time intervals (e.g., time intervals 720 reserved for high-priority traffic 710) referenced to a clock, a traffic specifier for hard-RT traffic (e.g., high-priority traffic 710), and a corresponding priority indicator. The access node may monitor for arrival of hard-RT traffic during the first set of absolute time intervals. When the access node observes an empty buffer status for the hard-RT traffic based on the monitoring (e.g., as shown with time interval 720-*b*), the access node may schedule lower-priority traffic with a temporal granularity of a time window (e.g., a subframe). When the monitoring indicates that downlink hard-RT traffic arrives during a designated time interval (e.g., as shown with time interval 720-*c*), the access node may disrupt the ongoing schedule in order to transmit the hard-RT traffic. Additionally, the access node may indicate the change of schedule to the wireless device (e.g., the UE 115). The access node may receive the configuration from a core network node or any network node.

Similar to FIG. 5, the above described procedure may include that the access node may receive a configuration, where the configuration may be provided by an MME, a GW, an AMF, a SMF, or a UPF. Alternatively, the access node may receive the configuration from another network node (e.g., on application layer). As described above, the configuration may include a traffic specifier, a corresponding priority indicator, a corresponding capacity demand, or a combination thereof for each of the hard-RT traffic (e.g., high-priority traffic 710) and the lower-priority traffic (e.g., low-priority traffic 715). In some cases, the traffic priority indicator may refer to a QCI, a QFI, or a 5QI. Additionally, the traffic specifier may refer to a bearer ID, a 5QI, a TFT entry, a flow indicator, a flow specifier, a PDN connection, a PDU session, or a tunnel ID.

Figure 8:
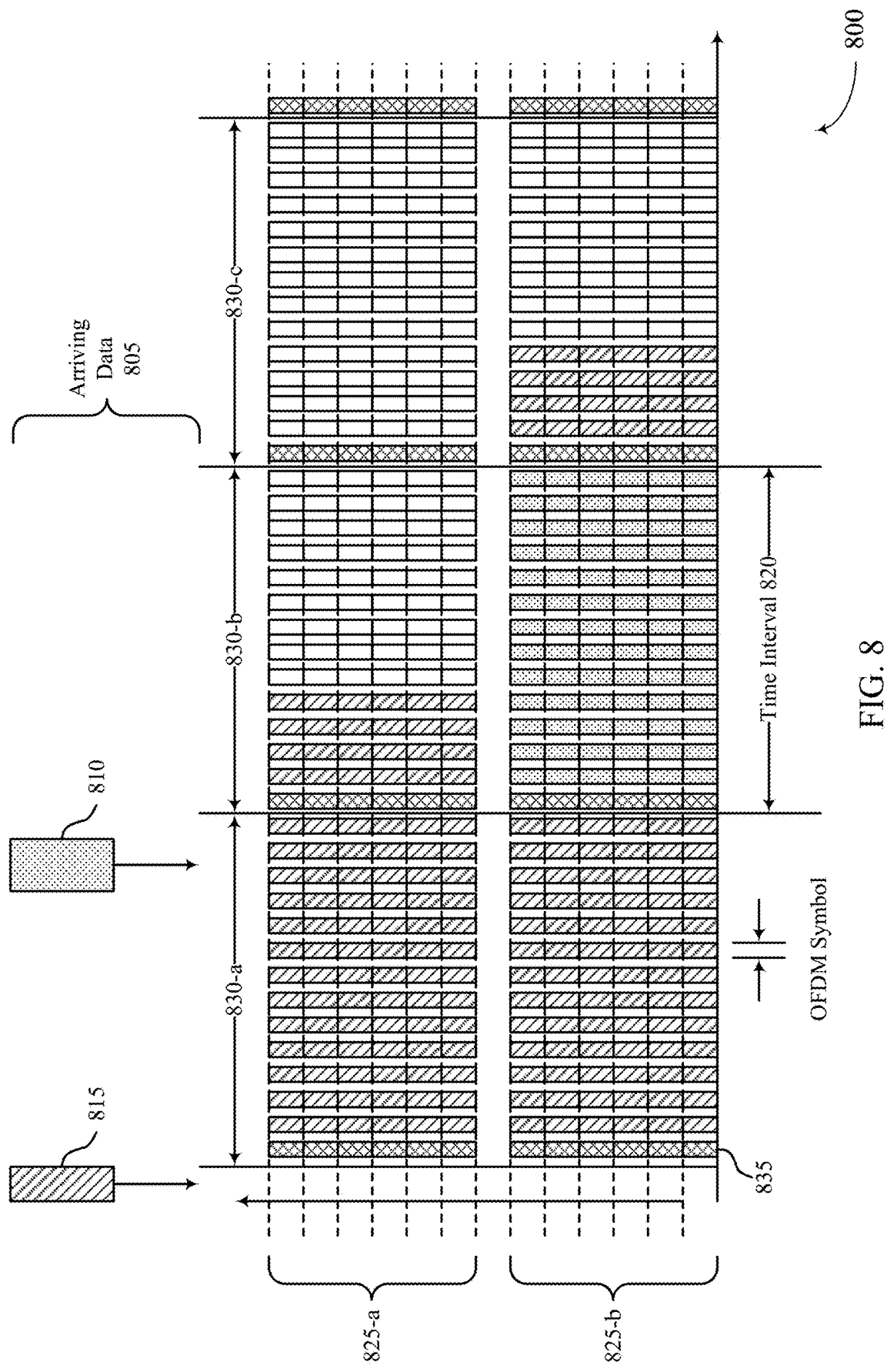
FIG. 8 illustrates an example of a priority scheduling disruption frame structure that supports TSN frame pre-emption across a cellular interface in accordance with aspects of the present disclosure.

FIG. 8 illustrates an example of a priority scheduling disruption frame structure 800 that supports TSN frame pre-emption across a cellular interface in accordance with various aspects of the present disclosure. In some examples, priority scheduling disruption frame structure 800 may implement aspects of wireless communications systems 100 and 200. Additionally, priority scheduling disruption frame structure 800 may include aspects of priority scheduling disruption scheme 700 as described above with reference to FIG. 7. Accordingly, an amount of arriving data 805, including high-priority traffic 810 and low-priority traffic 815, may be transmitted according to a disruption scheme, where an initial traffic schedule 825-*a* for low-priority traffic 815 may be adjusted to an actual traffic transmission schedule 825-*b* based on an arrival of high-priority traffic 810. High-priority traffic 810 and low-priority traffic 815 may be transmitted on the same resource. Priority scheduling disruption frame structure 800 may include a number of subframes 830 for transmitting high-priority traffic 810 and low-priority traffic 815, where each subframe 830 holds 14 OFDM symbols and the first of these symbols for each subframe 830 is used for a control channel 835 (e.g., a PDCCH).

For example, an amount of low-priority traffic 815 may arrive prior to a subframe 830-*a* (e.g., subframe m). Accordingly, low-priority traffic 815 may be scheduled according to initial traffic schedule 825-*a*, where symbols of both subframes 830-*a* and 830-*b* are allocated for low-priority traffic 815. This scheduling for both subframes 830-*a* and 830-*b* may be done via the control channel 835 during subframe 830-*a*. Additionally, subframe 830-*b* (e.g., subframe m+1) may include time interval 820, where the resource is reserved for high-priority traffic 810 when high-priority traffic 810 is present (e.g., where time interval 820 is determined from a first interface conveying a TSN time-aware schedule). As such, when high-priority traffic 810 arrives during subframe 830-*a*, the initial traffic schedule 825-*a* may be disrupted such that high-priority traffic 810 may be inserted during subframe 830-*b*. The remaining low-priority traffic 815 may then be appended in a subsequent subframe 830-*c* (e.g., subframe m+2) as shown with actual traffic transmission schedule 825-*b*. The scheduling update may be transmitted in a control channel 835 in subframes 830-*b* and 830-*c*.

While time interval 820 reserved for high-priority traffic 810 is shown covering one subframe 830, it is to be understood that time interval 820 may cover multiple subframes 830 or a fraction of a subframe 830 (e.g., a set of symbols or a mini frame). Additionally, while priority scheduling disruption frame structure 800 is shown with a frame structure which has been aligned with the time-aware schedule, it is further possible to apply the proposed scheme in cases where frame structure and time-aware scheduling are not time aligned.

Figure 9:
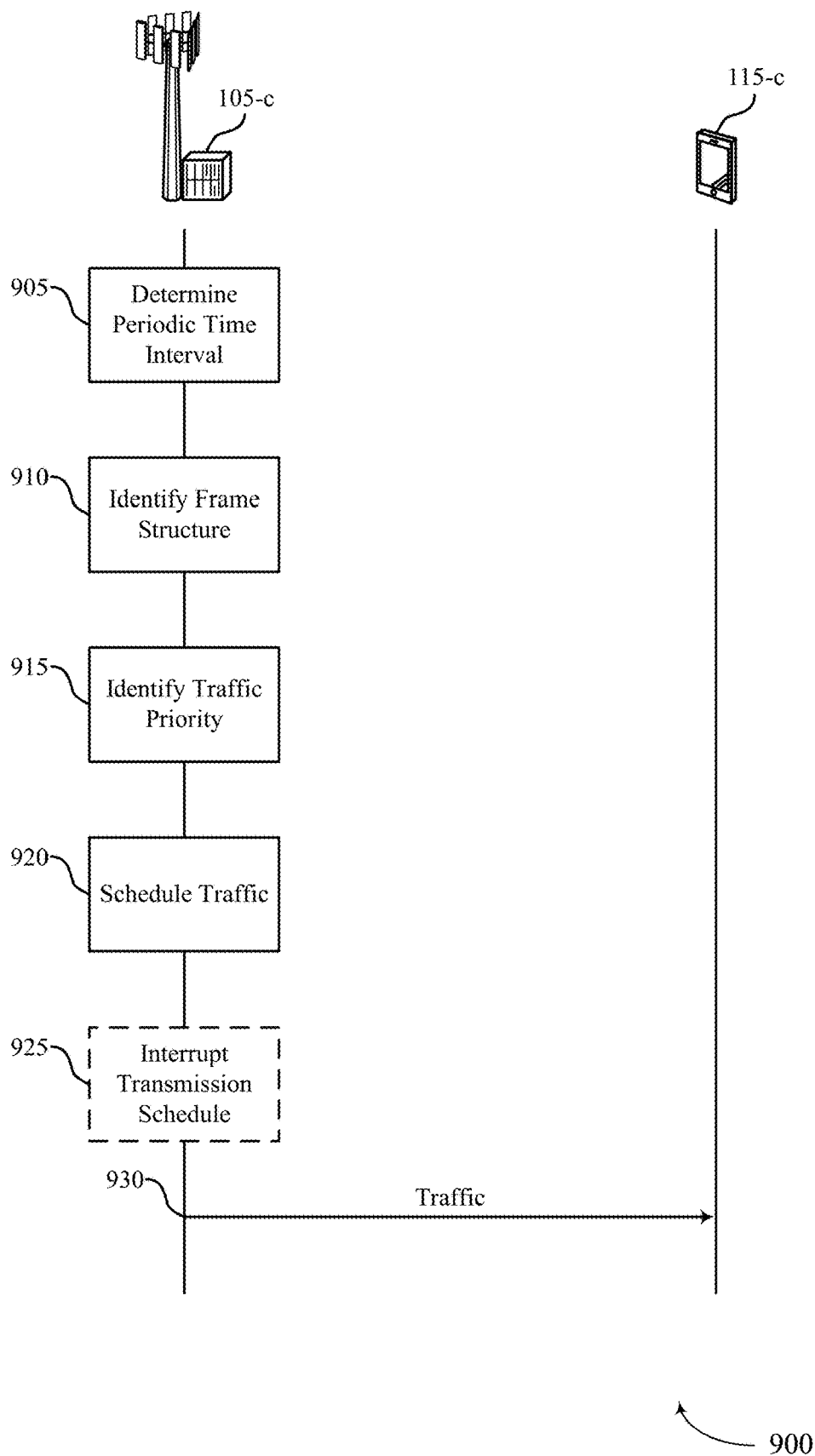
FIG. 9 illustrates an example of a process flow that supports TSN frame pre-emption across a cellular interface in accordance with aspects of the present disclosure.

FIG. 9 illustrates an example of a process flow 900 that supports TSN frame pre-emption across a cellular interface in accordance with various aspects of the present disclosure. In some examples, process flow 900 may implement aspects of wireless communications systems 100 and 200. Process flow 900 may include a base station 105-*c* (e.g., an access node) and a UE 115-*c*, which may be examples of base stations 105 and UEs 115 as described above with reference to FIGS. 1-8. Base station 105-*c* may schedule traffic of different priority levels for communicating with UE 115-*c* as described herein.

In the following description of the process flow 900, the operations between UE 115-*c* and base station 105-*c* may be performed in different orders or at different times. Certain operations may also be left out of the process flow 900, or other operations may be added to the process flow 900. It is to be understood that while base station 105-*c* is shown performing a number of the operations of process flow 900, any wireless device may perform the operations shown.

At 905, base station 105-*c* may determine a periodic time interval for transmission of traffic having a first traffic priority (e.g., high-priority traffic), the periodic time interval being based on a TSN schedule (e.g., a time-aware schedule) for hard-RT traffic received at a first interface of base station 105-*c* via an Ethernet frame (e.g., a wireless network).

At 910, base station 105-*c* may identify a wireless communication frame structure for communicating on a wireless communication link at a second interface of base station 105-*c* (e.g., with UE 115-*c*), the wireless communication frame structure including a first resource and a second resource that are available both within and outside of the periodic time for transmission of traffic having the first traffic priority. In some cases, the first resource and the second resource may be different from each other. For example, the first resource and the second resource may differ by at least one of frequency bands, subcarriers, tones, codes, MIMO layers, antenna ports, or beams. Additionally or alternatively, the wireless communication frame structure may include a single resource with the periodic time interval identified for priority communication of traffic having the first traffic priority.

In some cases, base station 105-*c* may identify a first capacity demand corresponding to traffic having the first traffic priority, identify a second capacity demand corresponding to traffic having a second traffic priority, and allocate (e.g., partition) the first resource and the second resource based on the first capacity demand, the second capacity demand, and a link capacity of the wireless communication link. Additionally or alternatively, base station 105-*c* may identify a first traffic specifier indicating traffic having the first traffic priority, identify a second traffic specifier indicating traffic having the second traffic priority, and schedule traffic based on whether the traffic is identified with either the first traffic specifier or the second traffic specifier.

In some cases, base station 105-*c* may identify a configuration for partition of a link capacity of the wireless communication link into the first resource and the second resource, the configuration based on a first capacity demand corresponding to traffic having the first traffic priority and a second capacity demand corresponding to traffic having the second traffic priority and based on including a first traffic specifier indicating traffic having the first traffic priority and a second traffic specifier indicating traffic having the second traffic priority. Base station 105-*c* may receive the configuration from a core network node or from another network node. In some cases, the network node may be one of an MME, a GW, an AMF, an SMF, or a UPF. Additionally, the first traffic specifier and the second traffic specifier may be indicated by at least one of a bearer ID, a 5QI, a TFT entry, a flow indicator, a flow specifier, a PDN connection, a PDU session, or a tunnel ID. In some cases, base station 105-*c* may identify a synchronization of the first resource and the second resource with an absolute clock.

At 915, base station 105-*c* may identify that traffic having the first traffic priority and that traffic having the second traffic priority (e.g., low-priority traffic) that is less than the first traffic priority is to be communicated between the first interface and the second interface. In some cases, the first traffic priority and the second traffic priority may be indicated by at least one of a QCI, a QFI, or a 5QI.

At 920, base station 105-*c* may schedule the traffic having the first traffic priority on the first resource of the wireless communication frame structure during the periodic time interval and may schedule the traffic having the second traffic priority on the second resource of the wireless communication frame structure during the periodic time interval and on both the first resource and the second resource of the wireless communication frame structure outside of the periodic time interval. In some cases, base station 105-*c* may schedule a first part of a transmission for the traffic having the second traffic priority on both the first resource and the second resource outside of the interval of time and may then schedule a second part of the transmission for the traffic having the second traffic priority on the second resource within the interval of time. Alternatively, base station 105-*c* may schedule a first part of a transmission for the traffic having the second traffic priority on the second resource within the interval of time and may then schedule a second part of the transmission for the traffic having the second traffic priority on both the first resource and the second resource outside of the interval of time.

Additionally or alternatively, at 920, base station 105-*c* may schedule, during the periodic time interval, the traffic having the second traffic of the wireless communication frame structure. However, in some cases, base station 105-*c* may identify that the traffic of the first traffic priority of the wireless communication frame structure is available for transmission during the periodic time interval. As such, at 925, base station 105-*c* may interrupt, based on the identification that the traffic of the first traffic priority is available, transmission of the scheduled traffic having the second traffic priority in order to transmit the traffic of the first traffic priority during the periodic time interval of the wireless communication frame structure.

At 930, base station 105-*c* may transmit the different leveled priority traffic according to the scheduled traffic determined at 920. In some cases, if the scheduled traffic is interrupted as described in 925, base station 105-c may accordingly transmit the interrupted transmission of the scheduled traffic.

Figure 10:
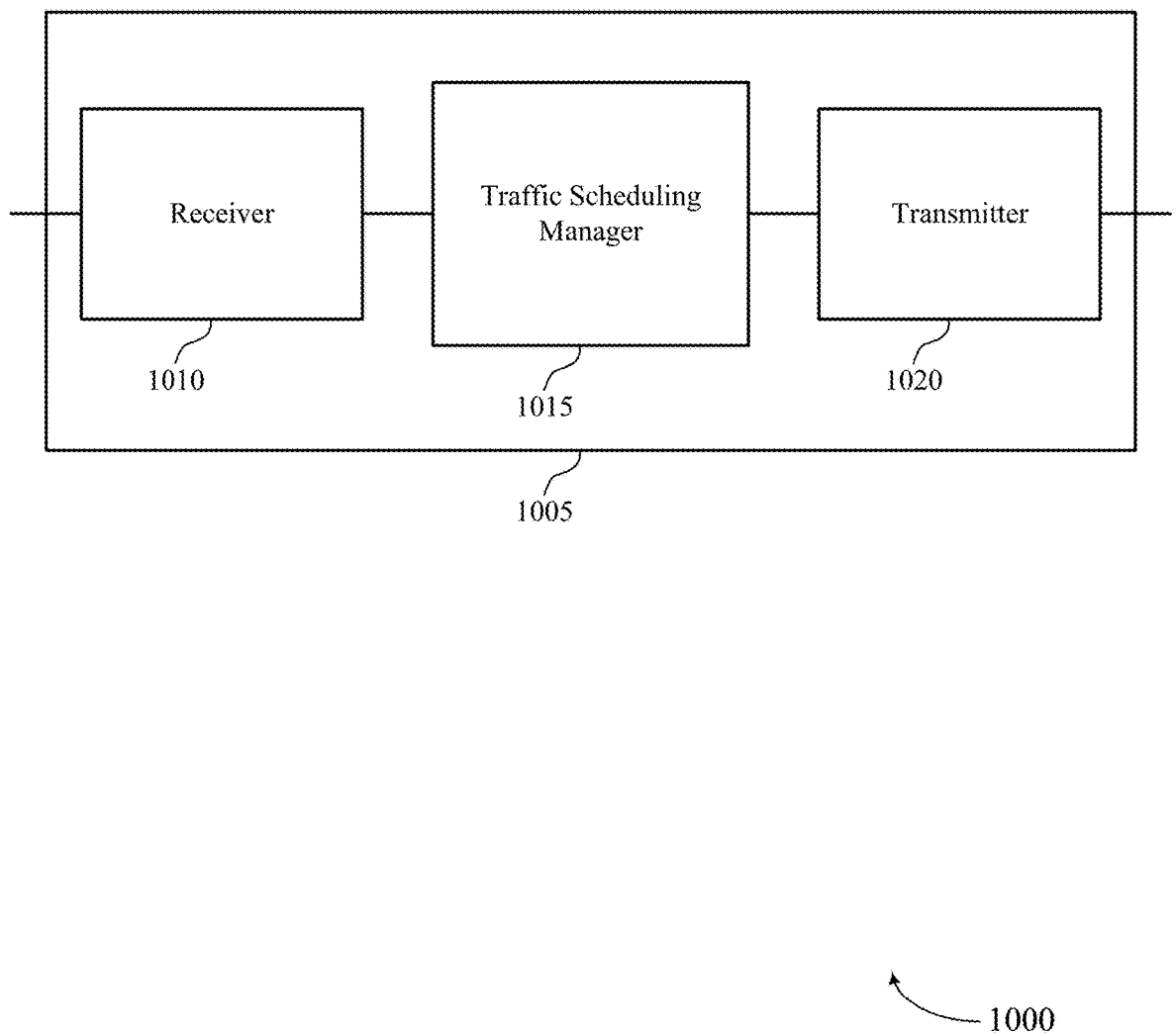
FIGS. 10 through 12 show block diagrams of a device that supports TSN frame pre-emption across a cellular interface in accordance with aspects of the present disclosure.

FIG. 10 shows a block diagram 1000 of a wireless device 1005 that supports TSN frame pre-emption across a cellular interface in accordance with aspects of the present disclosure. Wireless device 1005 may be an example of aspects of a UE 115 or base station 105 as described herein. Wireless device 1005 may include receiver 1010, traffic scheduling manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to TSN frame pre-emption across cellular interface, etc.). Information may be passed on to other components of the device. The receiver 1010 may be an example of aspects of the transceiver 1335 described with reference to FIG. 13. The receiver 1010 may utilize a single antenna or a set of antennas.

Traffic scheduling manager 1015 may be an example of aspects of the traffic scheduling manager 1315 described with reference to FIG. 13.

Traffic scheduling manager 1015 and/or at least some of its various sub-components may be implemented in hardware, software executed by a processor, firmware, or any combination thereof. If implemented in software executed by a processor, the functions of the traffic scheduling manager 1015 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The traffic scheduling manager 1015 and/or at least some of its various sub-components may be physically located at various positions, including being distributed such that portions of functions are implemented at different physical locations by one or more physical devices. In some examples, traffic scheduling manager 1015 and/or at least some of its various sub-components may be a separate and distinct component in accordance with various aspects of the present disclosure. In other examples, traffic scheduling manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Traffic scheduling manager 1015 may determine a periodic time interval for transmission of traffic having a first traffic priority, the periodic time interval being based on a TSN schedule for hard-RT traffic received at a first interface of a wireless device via an Ethernet frame. Traffic scheduling manager 1015 may also identify a wireless communication frame structure for communicating on a wireless communication link at a second interface of the wireless device, the wireless communication frame structure including a first resource and a second resource that are available both within and outside of the periodic time interval for transmission of traffic having the first traffic priority, where the first resource and the second resource are different from each other. In some cases, traffic scheduling manager 1015 may identify that traffic having the first traffic priority and that traffic having a second traffic priority that is less than the first traffic priority is to be communicated between the first interface and the second interface. Traffic scheduling manager 1015 may then schedule the traffic having the first traffic priority on the first resource of the wireless communication frame structure during the periodic time interval. Additionally, traffic scheduling manager 1015 may schedule the traffic having the second traffic priority on the second resource of the wireless communication frame structure during the periodic time interval and on both the first resource and the second resource of the wireless communication frame structure outside of the periodic time interval.

Additionally or alternatively, traffic scheduling manager 1015 may determine a periodic time interval for transmission of traffic having a first traffic priority, the periodic time interval being based on a TSN schedule for hard-RT traffic received at a first interface of a wireless device via an Ethernet frame. Traffic scheduling manager 1015 may also identify a wireless communication frame structure for communicating on a wireless communication link at a second interface of the wireless device, wherein the wireless device is configured for priority communication of traffic having the first traffic priority via the wireless communication frame structure during the periodic time interval. Traffic scheduling manager 1015 may identify that the traffic having the first traffic priority and that the traffic having a second traffic priority that is less than the first traffic priority is to be communicated between the first interface and the second interface. Accordingly, traffic scheduling manager 1015 may schedule, during the periodic time interval of the wireless communication frame structure, the traffic having the second traffic priority. In some cases, traffic scheduling manager 1015 may identify that the traffic of the first traffic priority is available for transmission during the periodic time interval of the wireless communication frame structure. Traffic scheduling manager 1015 may then interrupt, based on the identification that the traffic of the first traffic priority is available, transmission of the scheduled traffic having the second traffic priority in order to transmit the traffic of the first traffic priority during the periodic time interval of the wireless communication frame structure.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
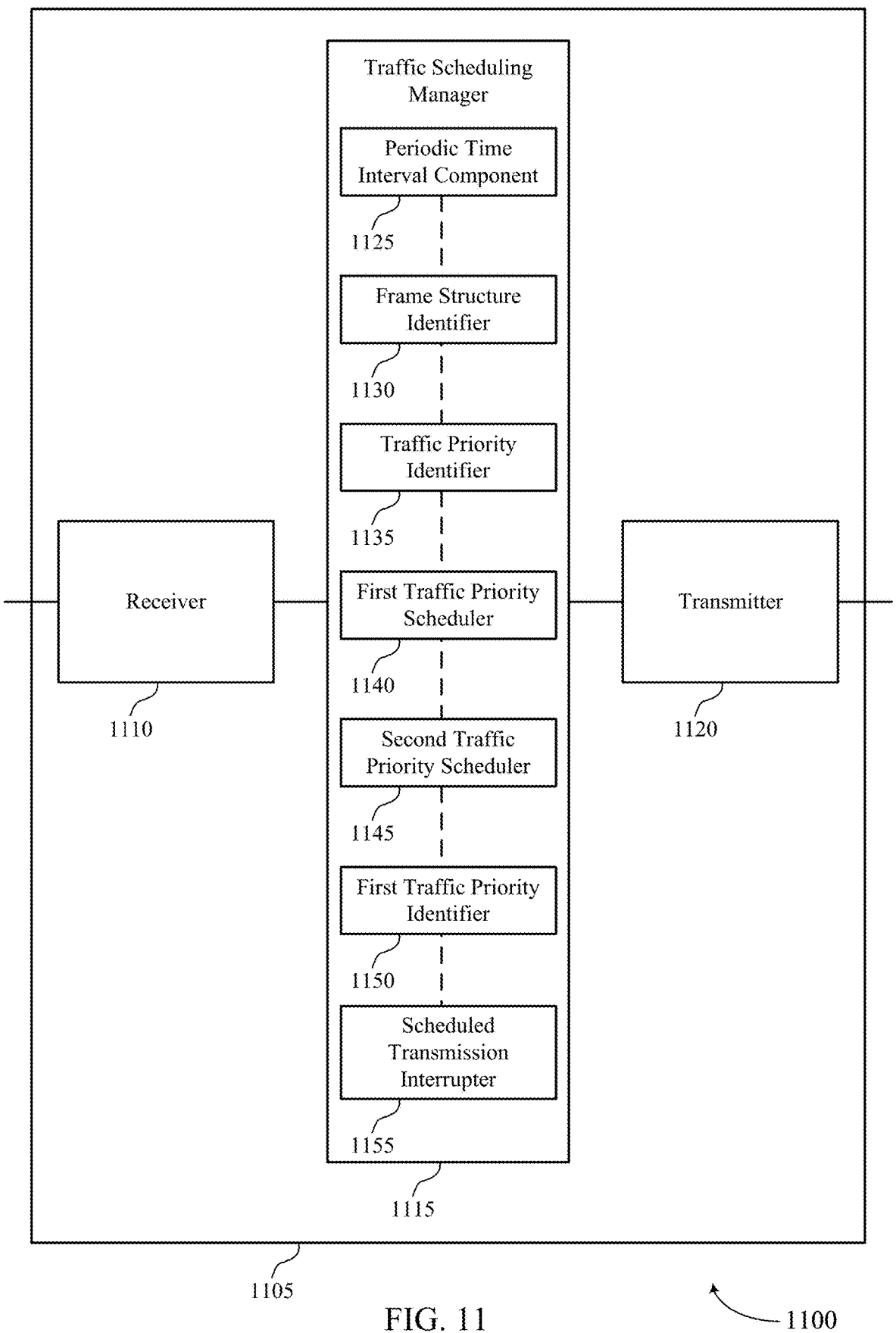

FIG. 11 shows a block diagram 1100 of a wireless device 1105 that supports TSN frame pre-emption across a cellular interface in accordance with aspects of the present disclosure. Wireless device 1105 may be an example of aspects of a wireless device 1005 or a UE 115 or base station 105 as described with reference to FIG. 10. Wireless device 1105 may include receiver 1110, traffic scheduling manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to TSN frame pre-emption across cellular interface, etc.). Information may be passed on to other components of the device. The receiver 1110 may be an example of aspects of the transceiver 1335 described with reference to FIG. 13. The receiver 1110 may utilize a single antenna or a set of antennas.

Traffic scheduling manager 1115 may be an example of aspects of the traffic scheduling manager 1315 described with reference to FIG. 13.

Traffic scheduling manager 1115 may also include periodic time interval component 1125, frame structure identifier 1130, traffic priority identifier 1135, first traffic priority scheduler 1140, second traffic priority scheduler 1145, first traffic priority identifier 1150, and scheduled transmission interrupter 1155.

Periodic time interval component 1125 may determine a periodic time interval for transmission of traffic having a first traffic priority, the periodic time interval being based on a TSN schedule for hard-RT traffic received at a first interface of a wireless device via an Ethernet frame.

Frame structure identifier 1130 may identify a wireless communication frame structure for communicating on a wireless communication link at a second interface of the wireless device, the wireless communication frame structure including a first resource and a second resource that are available both within and outside of the periodic time interval for transmission of traffic having the first traffic priority, where the first resource and the second resource are different from each other. Additionally or alternatively, frame structure identifier 1130 may identify a wireless communication frame structure for communicating on a wireless communication link at a second interface of the wireless device, wherein the wireless device is configured for priority communication of traffic having the first traffic priority via the wireless communication frame structure during the periodic time interval.

Traffic priority identifier 1135 may identify that the traffic having the first traffic priority and that the traffic having a second traffic priority that is less than the first traffic priority is to be communicated between the first interface and the second interface. In some cases, the first resource and the second resource differ by at least one of frequency bands, subcarriers, tones, codes, multiple input, MIMO layers, antenna ports, or beams. In some cases, the first traffic priority and the second traffic priority are indicated by at least one of a QCI, a QFI, or a 5QI.

First traffic priority scheduler 1140 may schedule the traffic having the first traffic priority on the first resource during the periodic time interval of the wireless communication frame structure.

Second traffic priority scheduler 1145 may schedule the traffic having the second traffic priority on the second resource during the periodic time interval of the wireless communication frame structure and on both the first resource and the second resource outside of the periodic time interval of the wireless communication frame structure. Additionally or alternatively, second traffic priority scheduler 1145 may schedule, during the periodic time interval of the wireless communication frame structure, traffic having the second traffic priority.

First traffic priority identifier 1150 may identify that the traffic of the first traffic priority is available for transmission during the periodic time interval of the wireless communication frame structure.

Scheduled transmission interrupter 1155 may interrupt, based on the identification that the traffic of the first traffic priority is available, transmission of the scheduled traffic having the second traffic priority in order to transmit the traffic of the first traffic priority during the periodic time interval of the wireless communication frame structure.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
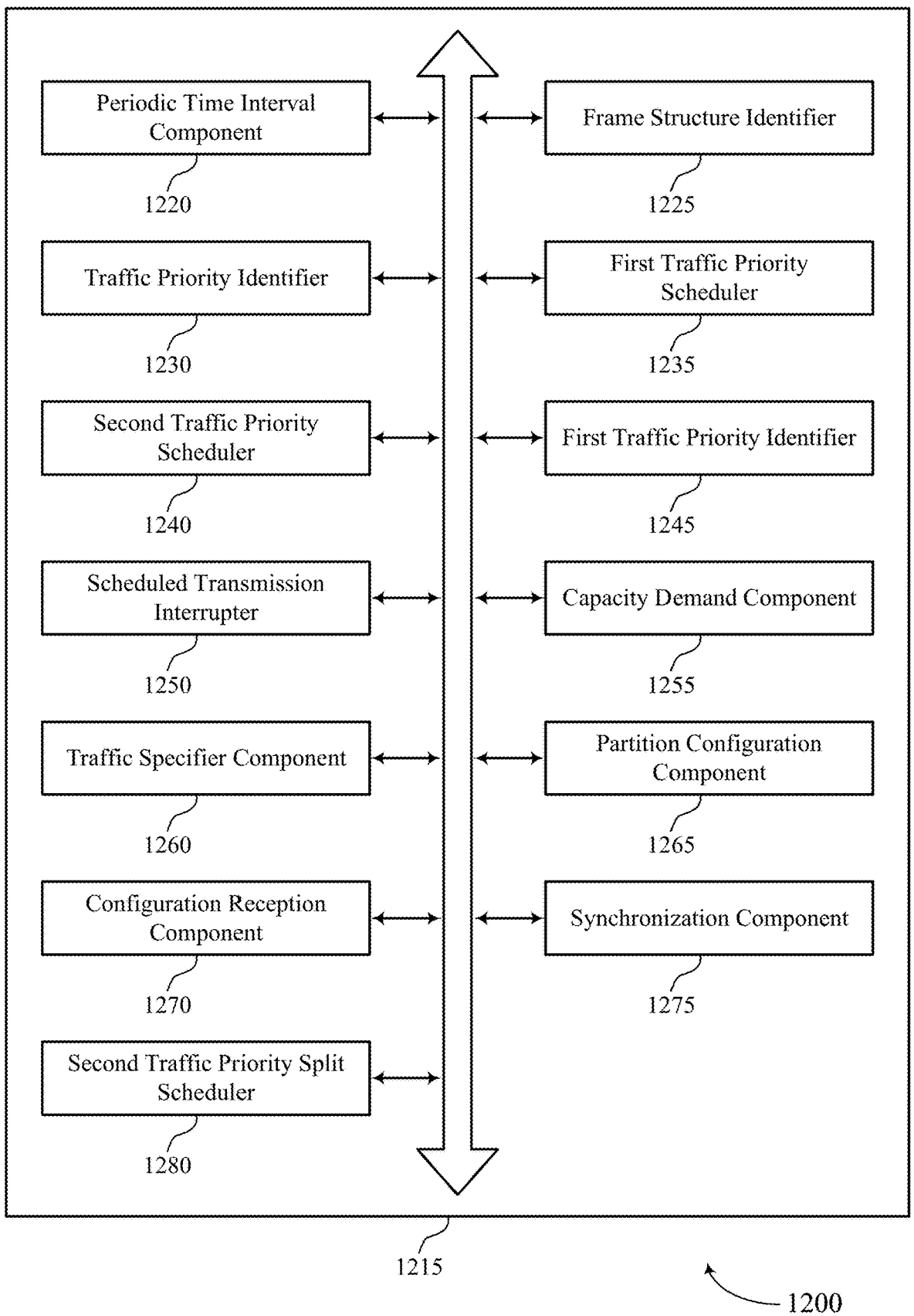

FIG. 12 shows a block diagram 1200 of a traffic scheduling manager 1215 that supports TSN frame pre-emption across a cellular interface in accordance with aspects of the present disclosure. The traffic scheduling manager 1215 may be an example of aspects of a traffic scheduling manager 1015, a traffic scheduling manager 1115, or a traffic scheduling manager 1315 described with reference to FIGS. 10, 11, and 13. The traffic scheduling manager 1215 may include periodic time interval component 1220, frame structure identifier 1225, traffic priority identifier 1230, first traffic priority scheduler 1235, second traffic priority scheduler 1240, first traffic priority identifier 1245, scheduled transmission interrupter 1250, capacity demand component 1255, traffic specifier component 1260, partition configuration component 1265, configuration reception component 1270, synchronization component 1275, and second traffic priority scheduler split 1280. Each of these modules may communicate, directly or indirectly, with one another (e.g., via one or more buses).

Periodic time interval component 1220 may determine a periodic time interval for transmission of traffic having a first traffic priority, the periodic time interval being based on a TSN schedule for hard-RT traffic received at a first interface of a wireless device via an Ethernet frame.

Frame structure identifier 1225 may identify a wireless communication frame structure for communicating on a wireless communication link at a second interface of the wireless device, the wireless communication frame structure including a first resource and a second resource that are available both within and outside of the periodic time interval for transmission of traffic having the first traffic priority, where the first resource and the second resource are different from each other. Additionally or alternatively, frame structure identifier 1225 may identify a wireless communication frame structure for communicating on a wireless communication link at a second interface of the wireless device, wherein the wireless device is configured for priority communication of traffic having the first traffic priority via the wireless communication frame structure during the periodic time interval.

Traffic priority identifier 1230 may identify that the traffic having the first traffic priority and that the traffic having a second traffic priority that is less than the first traffic priority is to be communicated between the first interface and the second interface. In some cases, the first resource and the second resource may differ by at least one of frequency bands, subcarriers, tones, codes, MIMO layers, antenna ports, or beams. In some cases, the first traffic priority and the second traffic priority may be indicated by at least one of a QCI, a QFI, or a 5QI.

First traffic priority scheduler 1235 may schedule the traffic having the first traffic priority on the first resource of the wireless communication frame structure during the periodic time interval.

Second traffic priority scheduler 1240 may schedule the traffic having the second traffic priority on the second resource during the periodic time interval of the wireless communication frame structure and on both the first resource and the second resource outside of the periodic time interval of the wireless communication frame structure.

Additionally or alternatively, second traffic priority scheduler 1240 may schedule, during the periodic time interval of the wireless communication frame structure, traffic having the second traffic priority.

First traffic priority identifier 1245 may identify that the traffic of the first traffic priority is available for transmission during the periodic time interval of the wireless communication frame structure.

Scheduled transmission interrupter 1250 may interrupt, based on the identification that the traffic of the first traffic priority is available, transmission of the scheduled traffic having the second traffic priority in order to transmit the traffic of the first traffic priority during the periodic time interval of the wireless communication frame structure.

Capacity demand component 1255 may identify a second capacity demand corresponding to traffic having the second traffic priority and allocate the first resource and the second resource based on the first capacity demand, the second capacity demand, and a link capacity of the wireless communication link. In some cases, identifying the wireless communication frame structure may include identifying a first capacity demand corresponding to traffic having the first traffic priority.

Traffic specifier component 1260 may identify a first traffic specifier indicating traffic having the first traffic priority and identify a second traffic specifier indicating traffic having the second traffic priority. Consequently, traffic specifier component 1260 may schedule traffic based on whether the traffic is identified with either the first traffic specifier or the second traffic specifier. Additionally or alternatively, traffic specifier component 1260 may identify a configuration for the periodic time interval of the wireless communication frame structure, the configuration including a first traffic specifier indicating traffic having the first traffic priority and a second traffic specifier indicating traffic having the second traffic priority. In some cases, the first traffic specifier and the second traffic specifier may be indicated by at least one of a bearer ID, a 5QI, a TFT entry, a flow indicator, a flow specifier, a PDN connection, a PDU session, or a tunnel ID.

Partition configuration component 1265 may identify a configuration for partition of a link capacity of the wireless communication link into the first resource and the second resource, the configuration based on a first capacity demand corresponding to traffic having the first traffic priority and a second capacity demand corresponding to traffic having the second traffic priority and based on including a first traffic specifier indicating traffic having the first traffic priority and a second traffic specifier indicating traffic having the second traffic priority.

Configuration reception component 1270 may receive the configuration from a core network node or from another network node. In some cases, the core network node may be one of an MME, a GW, an AMF, an SMF, or a UPF.

Synchronization component 1275 may identify a synchronization of the first resource and the second resource with an absolute clock.

Second traffic priority split scheduler 1280 may schedule a first part of a transmission for traffic having the second traffic priority on both the first resource and the second resource outside of the periodic time interval and schedule a second part of the transmission for traffic having the second traffic priority on the second resource within the periodic time interval. Additionally or alternatively, second traffic priority split scheduler 1280 may schedule a first part of a transmission for traffic having the second traffic priority on the second resource within the periodic time interval and schedule a second part of the transmission for traffic having the second traffic priority on both the first resource and the second resource outside of the periodic time interval.

Figure 13:
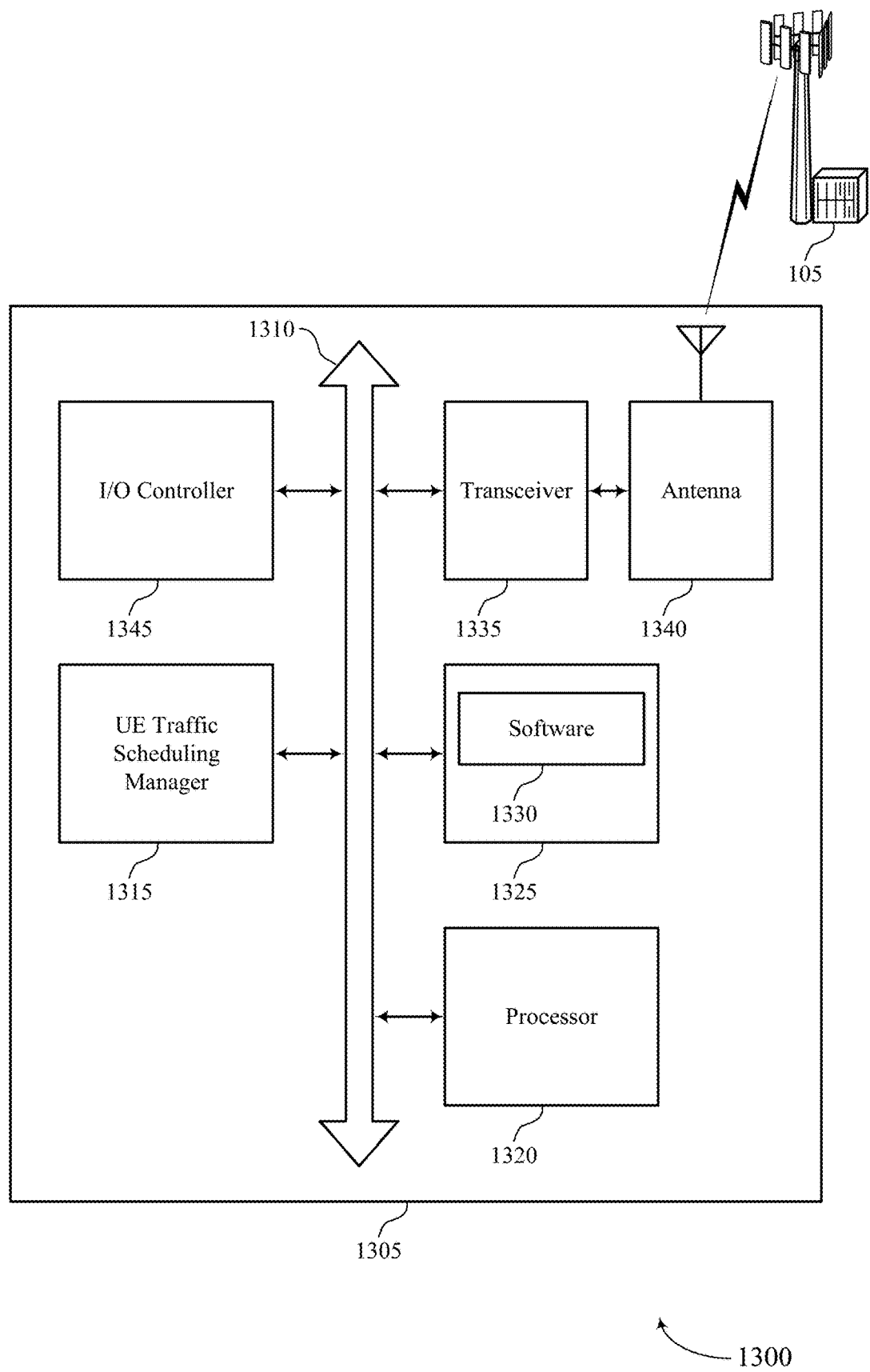
FIG. 13 illustrates a block diagram of a system including a user equipment (UE) that supports TSN frame pre-emption across a cellular interface in accordance with aspects of the present disclosure.

FIG. 13 shows a diagram of a system 1300 including a device 1305 that supports TSN frame pre-emption across a cellular interface in accordance with aspects of the present disclosure. Device 1305 may be an example of or include the components of wireless device 1005, wireless device 1105, or a UE 115 as described above, e.g., with reference to FIGS. 10 and 11. Device 1305 may include components for bi-directional voice and data communications including components for transmitting and receiving communications, including UE traffic scheduling manager 1315, processor 1320, memory 1325, software 1330, transceiver 1335, antenna 1340, and I/O controller 1345. These components may be in electronic communication via one or more buses (e.g., bus 1310). Device 1305 may communicate wirelessly with one or more base stations 105.

Processor 1320 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting TSN frame pre-emption across cellular interface).

Memory 1325 may include random-access memory (RAM) and read-only memory (ROM). The memory 1325 may store computer-readable, computer-executable software 1330 including instructions that, when executed, cause the processor to perform various functions described herein. In some cases, the memory 1325 may contain, among other things, a basic input/output system (BIOS) which may control basic hardware or software operation such as the interaction with peripheral components or devices.

Software 1330 may include code to implement aspects of the present disclosure, including code to support TSN frame pre-emption across cellular interface. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system. In other cases, I/O controller 1345 may represent or interact with a modem, a keyboard, a mouse, a touchscreen, or a similar device. In some cases, I/O controller 1345 may be implemented as part of a processor. In some cases, a user may interact with device 1305 via I/O controller 1345 or via hardware components controlled by I/O controller 1345.

Figure 14:
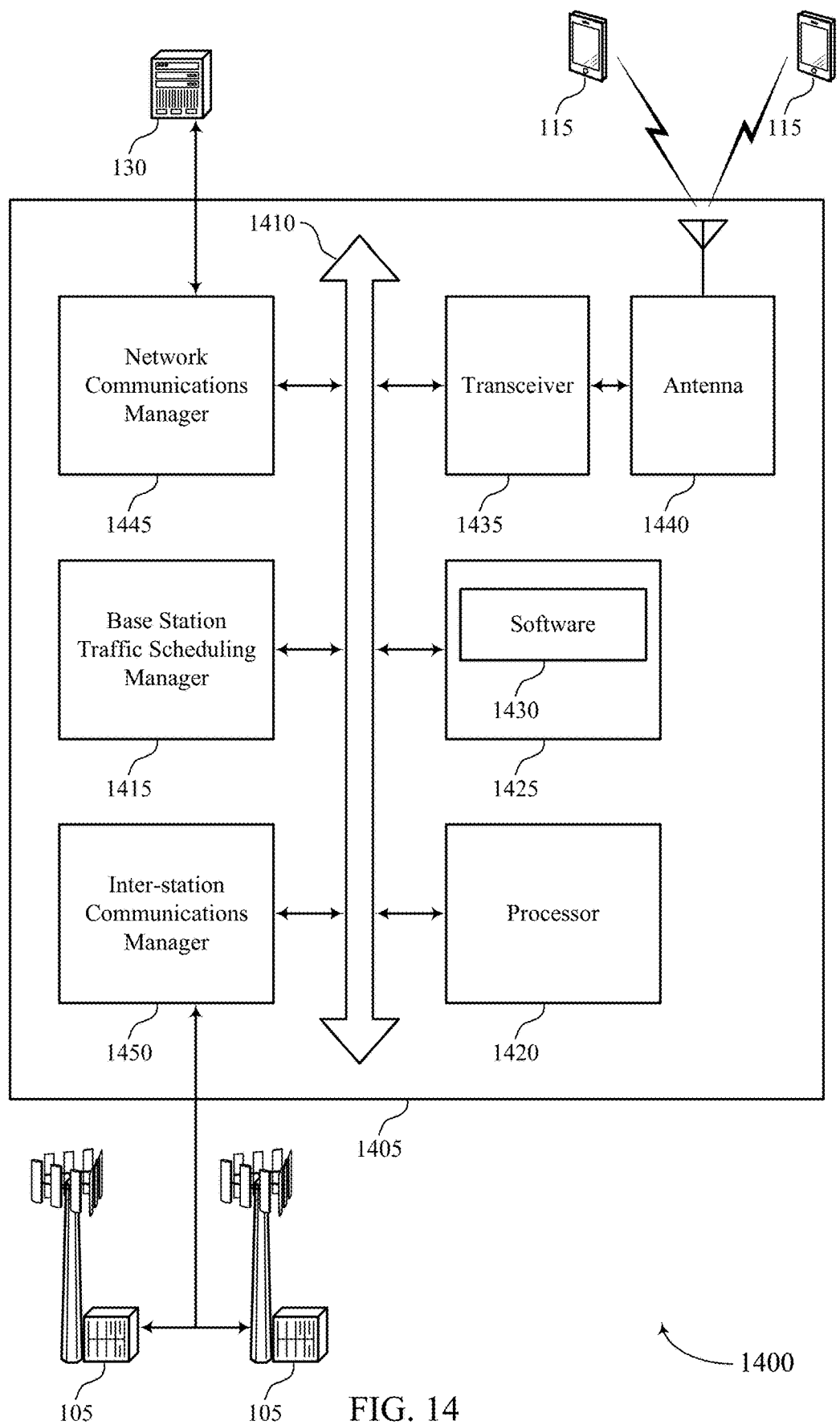
FIG. 14 illustrates a block diagram of a system including a base station that supports TSN frame pre-emption across a cellular interface in accordance with aspects of the present disclosure.

FIG. 14 shows a diagram of a system 1400 including a device 1405 that supports TSN frame pre-emption across a cellular interface in accordance with aspects of the present disclosure. Device 1405 may be an example of or include the components of wireless device 1105, wireless device 1205, or a base station 105 as described above, e.g., with reference to FIGS. 11 and 12. Device 1405 may include components for bi-directional voice and data communications including components for transmitting and receiving communications, including base station traffic scheduling manager 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting TSN frame pre-emption across cellular interface).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support TSN frame pre-emption across cellular interface. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105 and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an LTE/LTE-A wireless communication network technology to provide communication between base stations 105.

Figure 15:
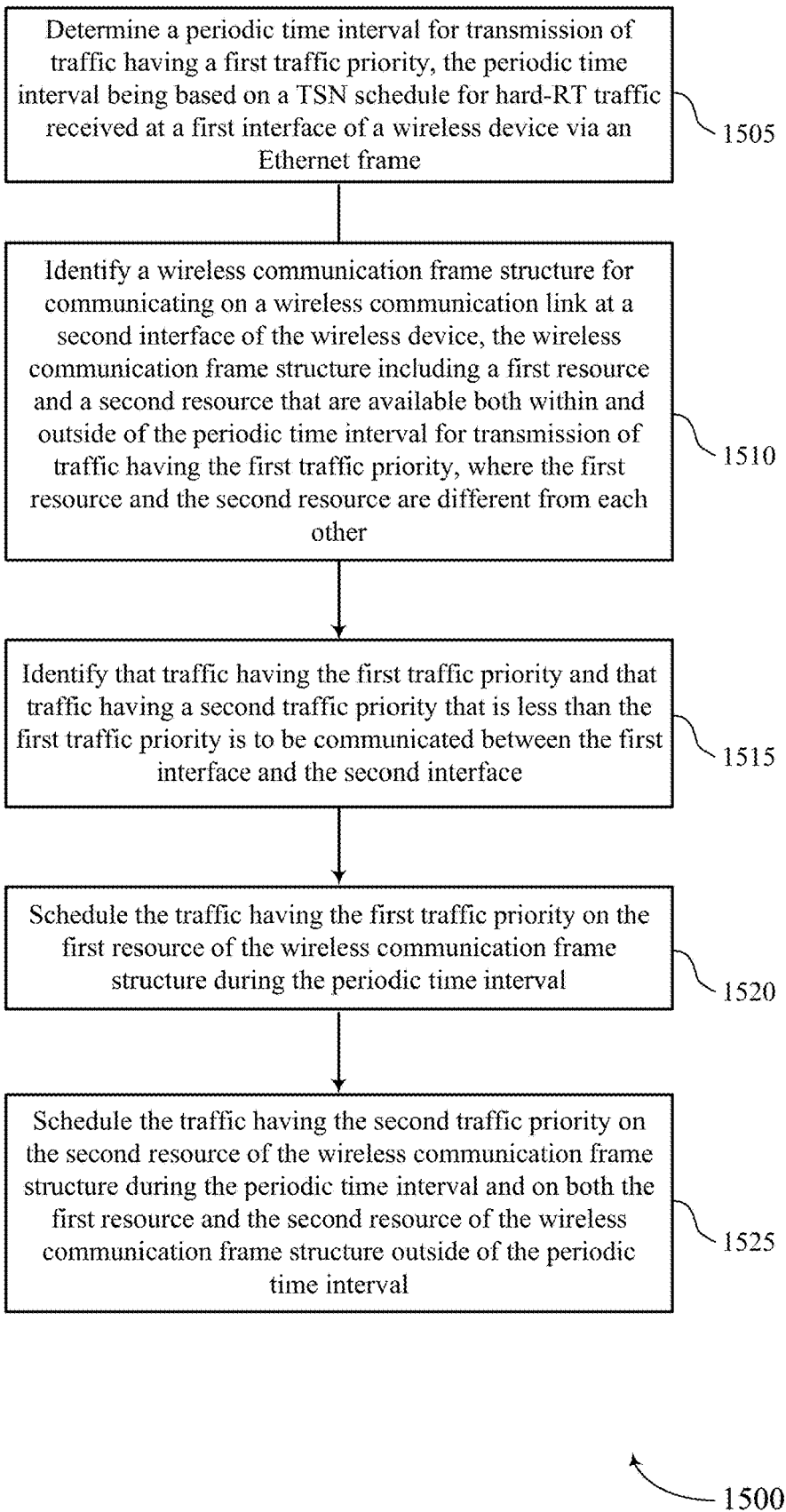
FIGS. 15 through 16 illustrate methods for TSN frame pre-emption across a cellular interface in accordance with aspects of the present disclosure.

FIG. 15 shows a flowchart illustrating a method 1500 for TSN frame pre-emption across a cellular interface in accordance with aspects of the present disclosure. The operations of method 1500 may be implemented by a UE 115 or base station 105 or its components as described herein. For example, the operations of method 1500 may be performed by a traffic scheduling manager as described with reference to FIGS. 10 through 12. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1505 the UE 115 or base station 105 may determine a periodic time interval for transmission of traffic having a first traffic priority, the periodic time interval being based on a TSN schedule for hard-RT traffic received at a first interface of a wireless device via an Ethernet frame. The operations of 1505 may be performed according to the methods described herein. In certain examples, aspects of the operations of 1505 may be performed by a periodic time interval component as described with reference to FIGS. 10 through 12.

At 1510 the UE 115 or base station 105 may identify a wireless communication frame structure for communicating on a wireless communication link at a second interface of the wireless device, the wireless communication frame structure including a first resource and a second resource that are available both within and outside of the periodic time for transmission of traffic having the first traffic priority, where the first resource and the second resource are different from each other. The operations of 1510 may be performed according to the methods described herein. In certain examples, aspects of the operations of 1510 may be performed by a frame structure identifier as described with reference to FIGS. 10 through 12.

At 1515 the UE 115 or base station 105 may identify that traffic having the first traffic priority and that traffic having a second traffic priority that is less than the first traffic priority is to be communicated between the first interface and the second interface. The operations of 1515 may be performed according to the methods described herein. In certain examples, aspects of the operations of 1515 may be performed by a traffic priority identifier as described with reference to FIGS. 10 through 12.

At 1520 the UE 115 or base station 105 may schedule the traffic having the first traffic priority on the first resource of the wireless communication frame structure during the periodic time interval. The operations of 1520 may be performed according to the methods described herein. In certain examples, aspects of the operations of 1520 may be performed by a first traffic priority scheduler as described with reference to FIGS. 10 through 12.

At 1525 the UE 115 or base station 105 may schedule the traffic having the second traffic priority on the second resource during the periodic time interval of the wireless communication frame structure and on both the first resource and the second resource outside of the periodic time interval of the wireless communication frame structure. The operations of 1525 may be performed according to the methods described herein. In certain examples, aspects of the operations of 1525 may be performed by a second traffic priority scheduler as described with reference to FIGS. 10 through 12.

Figure 16:
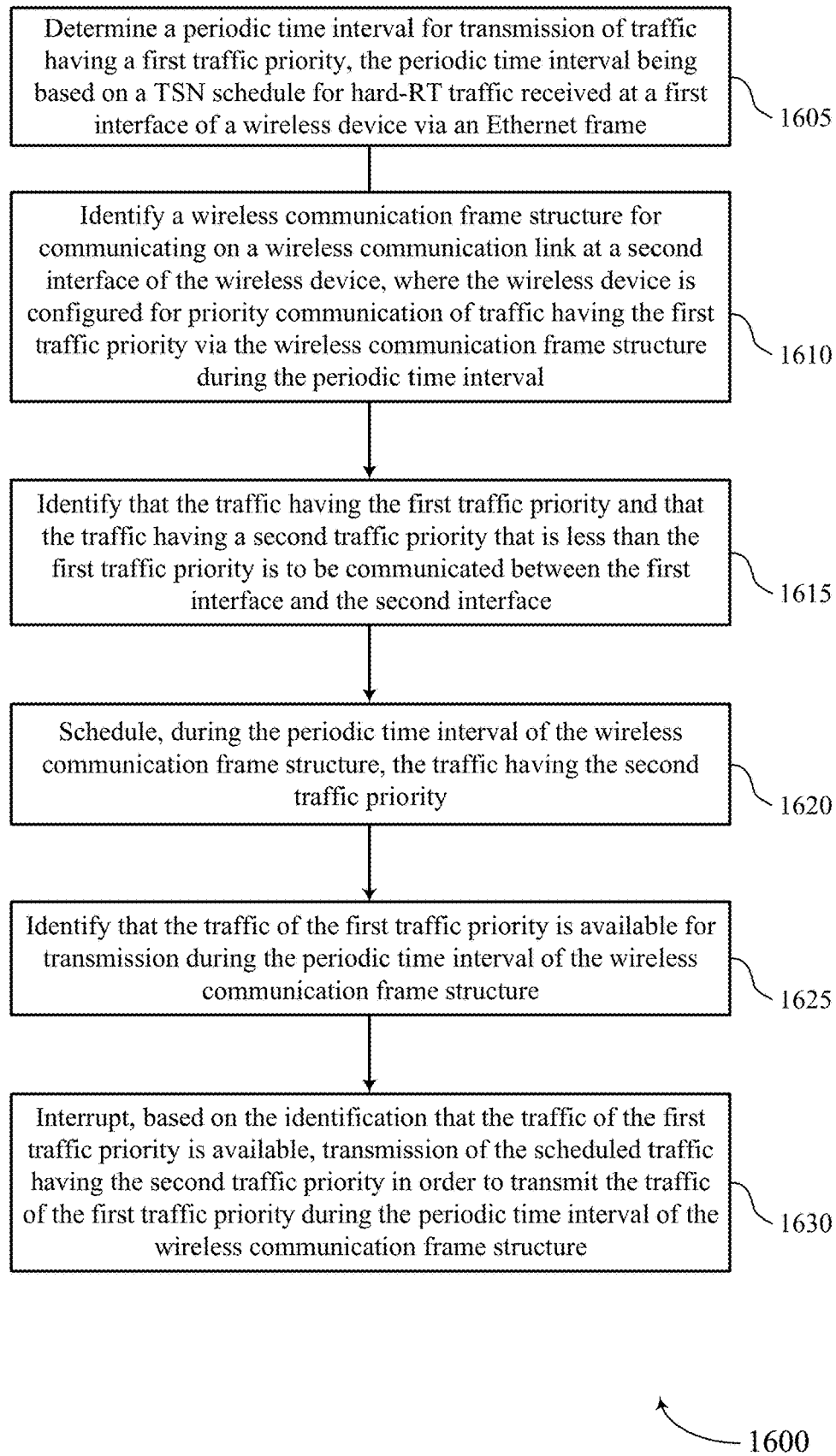

FIG. 16 shows a flowchart illustrating a method 1600 for TSN frame pre-emption across a cellular interface in accordance with aspects of the present disclosure. The operations of method 1600 may be implemented by a UE 115 or base station 105 or its components as described herein. For example, the operations of method 1600 may be performed by a traffic scheduling manager as described with reference to FIGS. 10 through 12. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1605 the UE 115 or base station 105 may determine a periodic time interval for transmission of traffic having a first traffic priority, the periodic time interval being based on a TSN schedule for hard-RT traffic received at a first interface of a wireless device via an Ethernet frame. The operations of 1605 may be performed according to the methods described herein. In certain examples, aspects of the operations of 1605 may be performed by a periodic time interval component as described with reference to FIGS. 10 through 12.

At 1610 the UE 115 or base station 105 may identify a wireless communication frame structure for communicating on a wireless communication link at a second interface of the wireless device, where the wireless device is configured for priority communication of traffic having the first traffic priority via the wireless communication frame structure during the periodic time interval. The operations of 1610 may be performed according to the methods described herein. In certain examples, aspects of the operations of 1610 may be performed by a frame structure identifier as described with reference to FIGS. 10 through 12.

At 1615 the UE 115 or base station 105 may identify that the traffic having the first the traffic priority and that traffic having a second traffic priority that is less than the first traffic priority is to be communicated between the first interface and the second interface. The operations of 1615 may be performed according to the methods described herein. In certain examples, aspects of the operations of 1615 may be performed by a traffic priority identifier as described with reference to FIGS. 10 through 12.

At 1620 the UE 115 or base station 105 may schedule, during the periodic time interval of the wireless communication frame structure, the traffic having the second traffic priority. The operations of 1620 may be performed according to the methods described herein. In certain examples, aspects of the operations of 1620 may be performed by a second traffic priority scheduler as described with reference to FIGS. 10 through 12.

At 1625 the UE 115 or base station 105 may identify that the traffic of the first traffic priority is available for transmission during the periodic time interval of the wireless communication frame structure. The operations of 1625 may be performed according to the methods described herein. In certain examples, aspects of the operations of 1625 may be performed by a first traffic priority identifier as described with reference to FIGS. 10 through 12.

At 1630 the UE 115 or base station 105 may interrupt, based at least in part on the identification that the traffic of the first traffic priority is available, transmission of the scheduled traffic having the second traffic priority in order to transmit the traffic of the first traffic priority during the periodic time interval of the wireless communication frame structure. The operations of 1630 may be performed according to the methods described herein. In certain examples, aspects of the operations of 1630 may be performed by a scheduled transmission interrupter as described with reference to FIGS. 10 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication, comprising:
 determining a periodic time interval for transmission of traffic having a first traffic priority, the periodic time interval being based on a time-sensitive networking (TSN) schedule for hard-real time (RT) traffic received at a first interface of a wireless device via an Ethernet frame;
 identifying a wireless communication frame structure for communicating on a wireless communication link at a second interface of the wireless device, the wireless communication frame structure including a first resource and a second resource that are available both within and outside of the periodic time interval for transmission of traffic having the first traffic priority, wherein the first resource and the second resource are different from each other;
 identifying that traffic having the first traffic priority and that traffic having a second traffic priority that is less than the first traffic priority is to be communicated between the first interface and the second interface;
 scheduling the traffic having the first traffic priority on the first resource of the wireless communication frame structure during the periodic time interval; and
 scheduling the traffic having the second traffic priority on the second resource of the wireless communication frame structure during the periodic time interval and on both the first resource and the second resource of the wireless communication frame structure outside of the periodic time interval.

2. The method of claim 1, wherein identifying the wireless communication frame structure comprises:
 identifying a first capacity demand corresponding to traffic having the first traffic priority;
 identifying a second capacity demand corresponding to traffic having the second traffic priority; and
 allocating the first resource and the second resource based at least in part on the first capacity demand, the second capacity demand, and a link capacity of the wireless communication link.

3. The method of claim 1, further comprising:
 identifying a first traffic specifier indicating traffic having the first traffic priority;
 identifying a second traffic specifier indicating traffic having the second traffic priority; and
 scheduling traffic based at least in part on whether the traffic is identified with either the first traffic specifier or the second traffic specifier.

4. The method of claim 1, further comprising:
 identifying a configuration for partition of a link capacity of the wireless communication link into the first resource and the second resource, the configuration based on a first capacity demand corresponding to traffic having the first traffic priority and a second capacity demand corresponding to traffic having the second traffic priority, and including a first traffic specifier indicating traffic having the first traffic priority and a second traffic specifier indicating traffic having the second traffic priority.

5. The method of claim 4, wherein identifying the configuration comprises:
 receiving the configuration from a core network node or from another network node.

6. The method of claim 5, wherein the core network node is one of a mobility management entity (MME), a gateway (GW), a core access and mobility management function (AMF), a session management function (SMF), or a user plane function (UPF).

7. The method of claim 4, wherein the first traffic specifier and the second traffic specifier are indicated by at least one of a bearer identifier (ID), a fifth generation (5G) quality of service (QoS) indicator (5QI), a traffic flow template (TFT) entry, a flow indicator, a flow specifier, a packet data network (PDN) connection, a protocol data unit (PDU) session, or a tunnel ID.

8. The method of claim 4, wherein identifying the configuration comprises:
 identifying a synchronization of the first resource and the second resource with an absolute clock.

9. The method of claim 1, further comprising:
 scheduling a first part of a transmission for the traffic having the second traffic priority on both the first resource and the second resource outside of the periodic time interval; and
 scheduling a second part of the transmission for the traffic having the second traffic priority on the second resource within the periodic time interval.

10. The method of claim 1, further comprising:
 scheduling a first part of a transmission for the traffic having the second traffic priority on the second resource within the periodic time interval; and
 scheduling a second part of the transmission for the traffic having the second traffic priority on both the first resource and the second resource outside of the periodic time interval.

11. The method of claim 1, wherein the first resource and the second resource differ by at least one of frequency bands, subcarriers, tones, codes, multiple-input multiple-output (MIMO) layers, antenna ports, or beams.

12. The method of claim 1, wherein the first traffic priority and the second traffic priority are indicated by at least one of a quality of service (QoS) class identifier (QCI), a QoS flow identifier (QFI), or a fifth generation (5G) QoS indicator (5QI).

13. A method for wireless communication, comprising:
 determining a periodic time interval for transmission of traffic having a first traffic priority, the periodic time interval being based on a time-sensitive networking (TSN) schedule for hard-real time (RT) traffic received at a first interface of a wireless device via an Ethernet frame;
 identifying a wireless communication frame structure for communicating on a wireless communication link at a second interface of the wireless device, wherein the wireless device is configured for priority communication of traffic having the first traffic priority via the wireless communication frame structure during the periodic time interval;
 identifying that the traffic having the first traffic priority and that the traffic having a second traffic priority that is less than the first traffic priority is to be communicated between the first interface and the second interface;
 scheduling, during the periodic time interval of the wireless communication frame structure, the traffic having the second traffic priority;
 identifying that the traffic of the first traffic priority is available for transmission during the periodic time interval of the wireless communication frame structure; and
 interrupting, based at least in part on the identification that the traffic of the first traffic priority is available, transmission of the scheduled traffic having the second traffic priority in order to transmit the traffic of the first traffic priority during the periodic time interval of the wireless communication frame structure.

14. The method of claim 13, further comprising:
identifying a configuration for the periodic time interval of the wireless communication frame structure, the configuration including a first traffic specifier indicating traffic having the first traffic priority and a second traffic specifier indicating traffic having the second traffic priority.

15. The method of claim 14, wherein identifying the configuration comprises:
receiving the configuration from a core network node or from another network node.

16. The method of claim 15, wherein the core network node is one of a mobility management entity (MME), a gateway (GW), a core access and mobility management function (AMF), a session management function (SMF), or a user plane function (UPF).

17. The method of claim 14, wherein the first traffic specifier and the second traffic specifier are indicated by at least one of a bearer identifier (ID), a fifth generation (5G) quality of service (QoS) indicator (5QI), a traffic flow template (TFT) entry, a flow indicator, a flow specifier, a packet data network (PDN) connection, a protocol data unit (PDU) session, or a tunnel ID.

18. The method of claim 14, wherein identifying the configuration comprises:
identifying a synchronization of the periodic time interval with an absolute clock.

19. The method of claim 13, wherein the first traffic priority and the second traffic priority are indicated by at least one of a quality of service (QoS) class identifier (QCI), a QoS flow identifier (QFI), or a fifth generation (5G) QoS indicator (5QI).

20. An apparatus for wireless communication, comprising:
a processor;
memory coupled with the processor; and
instructions stored in the memory and executable by the processor to cause the apparatus to:
determine a periodic time interval for transmission of traffic having a first traffic priority, the periodic time interval being based on a time-sensitive networking (TSN) schedule for hard-real time (RT) traffic received at a first interface of a wireless device via an Ethernet frame;
identify a wireless communication frame structure for communicating on a wireless communication link at a second interface of the wireless device, the wireless communication frame structure including a first resource and a second resource that are available both within and outside of the periodic time interval for transmission of traffic having the first traffic priority, wherein the first resource and the second resource are different from each other;
identify that traffic having the first traffic priority and that traffic having a second traffic priority that is less than the first traffic priority is to be communicated between the first interface and the second interface;
schedule the traffic having the first traffic priority on the first resource of the wireless communication frame structure during the periodic time interval; and
schedule the traffic having the second traffic priority on the second resource of the wireless communication frame structure during the periodic time interval and on both the first resource and the second resource of the wireless communication frame structure outside of the periodic time interval.

21. The apparatus of claim 20, wherein the instructions to identify the wireless communication frame structure are executable by the processor to cause the apparatus to:
identify a first capacity demand corresponding to traffic having the first traffic priority;
identify a second capacity demand corresponding to traffic having the second traffic priority; and
allocate the first resource and the second resource based at least in part on the first capacity demand, the second capacity demand, and a link capacity of the wireless communication link.

22. The apparatus of claim 20, wherein the instructions are further executable by the processor to cause the apparatus to:
identify a first traffic specifier indicating traffic having the first traffic priority;
identify a second traffic specifier indicating traffic having the second traffic priority; and
schedule traffic based at least in part on whether the traffic is identified with either the first traffic specifier or the second traffic specifier.

23. The apparatus of claim 20, wherein the instructions are further executable by the processor to cause the apparatus to:
identify a configuration for partition of a link capacity of the wireless communication link into the first resource and the second resource, the configuration based on a first capacity demand corresponding to traffic having the first traffic priority and a second capacity demand corresponding to traffic having the second traffic priority, and including a first traffic specifier indicating traffic having the first traffic priority and a second traffic specifier indicating traffic having the second traffic priority.

24. The apparatus of claim 23, wherein the instructions to identify the configuration are executable by the processor to cause the apparatus to:
receive the configuration from a core network node or from another network node.

25. The apparatus of claim 24, wherein the core network node is one of a mobility management entity (MME), a gateway (GW), a core access and mobility management function (AMF), a session management function (SMF), or a user plane function (UPF).

26. The apparatus of claim 23, wherein the first traffic specifier and the second traffic specifier are indicated by at least one of a bearer identifier (ID), a fifth generation (5G) quality of service (QoS) indicator (5QI), a traffic flow template (TFT) entry, a flow indicator, a flow specifier, a packet data network (PDN) connection, a protocol data unit (PDU) session, or a tunnel ID.

27. The apparatus of claim 23, wherein the instructions to identify the configuration are executable by the processor to cause the apparatus to:
identify a synchronization of the first resource and the second resource with an absolute clock.

28. An apparatus for wireless communication, comprising:
a processor;
memory coupled with the processor; and
instructions stored in the memory and executable by the processor to cause the apparatus to:
determine a periodic time interval for transmission of traffic having a first traffic priority, the periodic time interval being based on a time-sensitive networking (TSN) schedule for hard-real time (RT) traffic received at a first interface of a wireless device via an Ethernet frame;

identify a wireless communication frame structure for communicating on a wireless communication link at a second interface of the wireless device, wherein the wireless device is configured for priority communication of traffic having the first traffic priority via the wireless communication frame structure during the periodic time interval;

identify that traffic having the first traffic priority and that traffic having a second traffic priority that is less than the first traffic priority is to be communicated between the first interface and the second interface;

schedule, during the periodic time interval of the wireless communication frame structure, traffic having the second traffic priority;

identify that traffic of the first traffic priority is available for transmission during the periodic time interval of the wireless communication frame structure; and interrupt, based at least in part on the identification that traffic of the first traffic priority is available, transmission of the scheduled traffic having the second traffic priority in order to transmit the traffic of the first traffic priority during the periodic time interval of the wireless communication frame structure.

29. The apparatus of claim 28, wherein the instructions are further executable by the processor to cause the apparatus to:

identify a configuration for the periodic time interval of the wireless communication frame structure, the configuration including a first traffic specifier indicating traffic having the first traffic priority and a second traffic specifier indicating traffic having the second traffic priority.

30. The apparatus of claim 29, wherein the instructions to identify the configuration are executable by the processor to cause the apparatus to:

receive the configuration from a core network node or from another network node.

* * * * *